United States Patent [19]

Hitchcock

[11] Patent Number: 4,761,815

[45] Date of Patent: Aug. 2, 1988

[54] SPEECH RECOGNITION SYSTEM BASED ON WORD STATE DURATION AND/OR WEIGHT

[75] Inventor: Myron H. Hitchcock, Englewood, Colo.

[73] Assignee: Figgie International, Inc., Richmond, Va.

[21] Appl. No.: 475,888

[22] Filed: Mar. 16, 1983

Related U.S. Application Data

[63] Continuation-in-part of Ser. No. 259,695, May 1, 1981, Pat. No. 4,388,495.

[51] Int. Cl.[4] .............................................. G10L 5/00
[52] U.S. Cl. ................................................ 381/43
[58] Field of Search ................ 179/1 SD, 1 SB, 1 SC, 179/1 SA, 15.55 R, 15.55 T; 381/41-45

[56] References Cited

U.S. PATENT DOCUMENTS

| | | | |
|---|---|---|---|
| 3,238,303 | 3/1966 | Dersch | 381/43 |
| 3,265,814 | 8/1966 | Maeda et al. | 381/43 |
| 3,278,685 | 10/1966 | Harper | 179/1 |
| 3,530,243 | 9/1970 | Bezdel | 179/1 |
| 3,812,291 | 5/1974 | Brodes et al. | 381/43 |
| 3,816,722 | 6/1974 | Sakoe et al. | 381/43 |
| 3,943,295 | 3/1976 | Martin et al. | 381/43 |
| 3,946,157 | 3/1976 | Dreyfus | 381/43 |
| 3,969,700 | 7/1976 | Bollinger et al. | 381/43 |
| 4,100,370 | 7/1978 | Suzuki et al. | 381/42 |
| 4,156,868 | 5/1979 | Levinson | 381/43 |

FOREIGN PATENT DOCUMENTS 1547026 1/1965 Fed. Rep. of Germany .
1155422 6/1969 United Kingdom .

OTHER PUBLICATIONS

"A Speaker Independent Digit Recognition System" by M. R. Sambur and L. R. Rabiner in the Bell System Technical Journal, vol. 54, No. 1, Jan. 1975, pp. 81–102.
"Zero Crossing Measurements for Analysis and Recognition of Speech Sounds" by Robert Ito and Robert W. Donaldson in IEEE Transactions on Audio and Electroacoustics, vol. AU-19, No. 3, Sep. 1971.
"Speech Recognition Using Zero Crossing Measurements and Sequence Information" by W. Bezdel, et al., from Proceedings of the Institution of Engineers, vol. 116, Apr. 1969, pp. 617–624.
"Low Cost Chips Can Propel Speech Recognition into Toys and Games" by Mike Hitchcock in Speech Technology, vol. 1, No. 1, Fall 1981.
"A Look Inside One Recognition Chip" by Bruce T. Lowerre in Speech Technology, vol. 1, No. 2, Apr. 1982, pp. 77–78.
"Single Chip Voice Recognition System", an advertising handout copyrighted in 1981 by Weitek, VLSI Systems and Technology.

*Primary Examiner*—Emanuel S. Kemeny
*Attorney, Agent, or Firm*—Knobbe, Martens, Olson & Bear

[57] ABSTRACT

A low cost, speaker independent, limited vocabulary, word recognizing microcomputer. The microcomputer divides each spoken word into a series of word states, determines the length of each state and classifies each state as fricative, vowel-like, or silent. The incoming speech pattern, in the form of two arrays: an array of classified word states and an array of associated word lengths is then compared sequentially with a series of templates, defining the limited vocabulary stored in the microcomputer's memory. Where the states match, an error score is generated based on the difference in lengths between the template lengths and the word state lengths. Provision is made for recognizing a spoken word as a template word even when the array of states representing the spoken word is not identical to an array of states in any of the template words. This permits recognition of the same word by the microcomputer even when the word is spoken in substantially different ways.

33 Claims, 7 Drawing Sheets

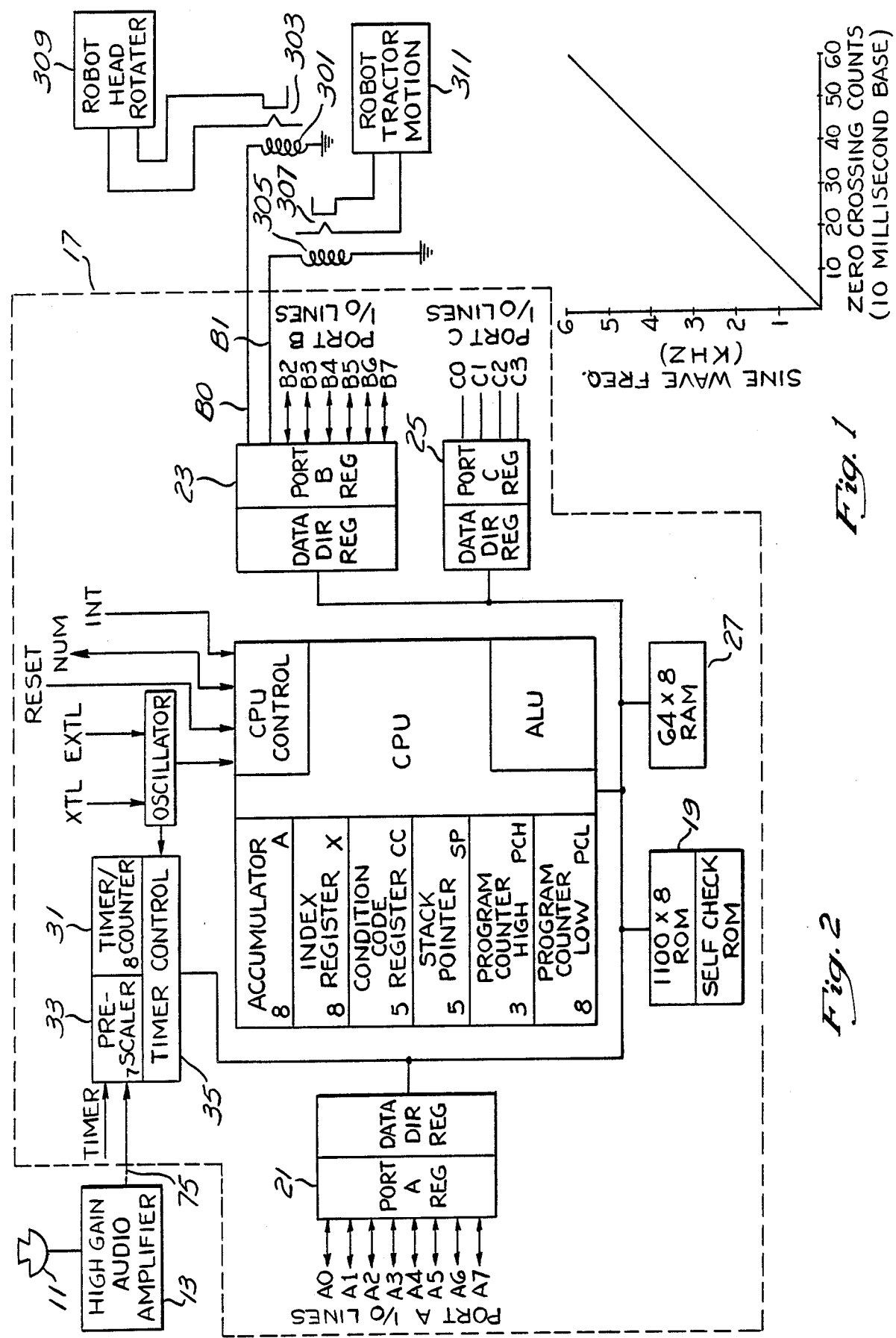

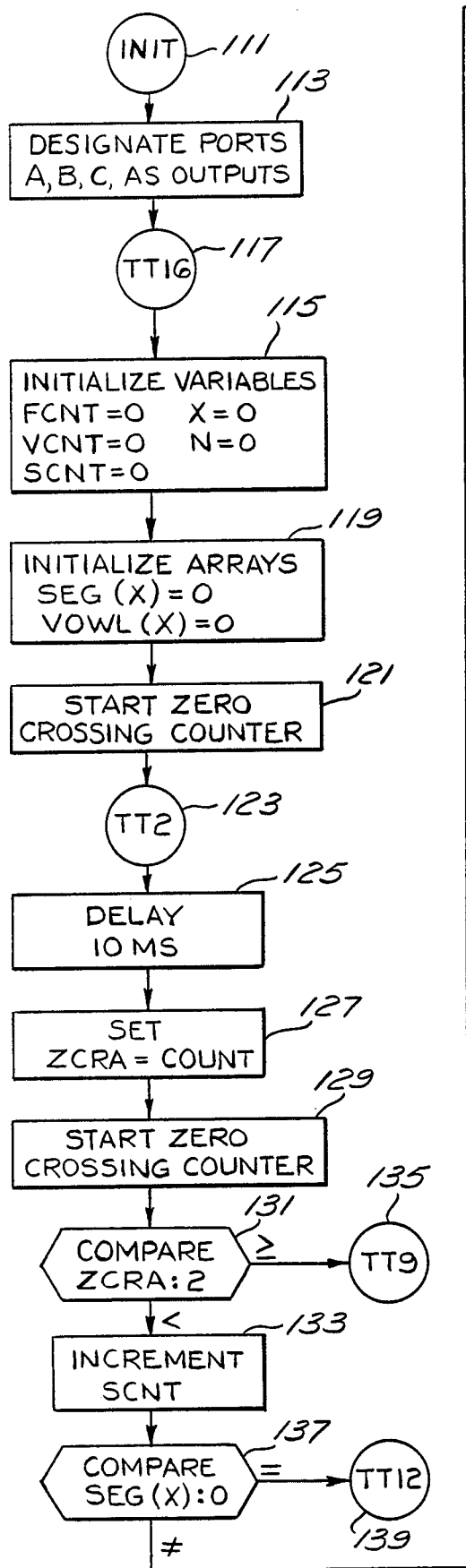
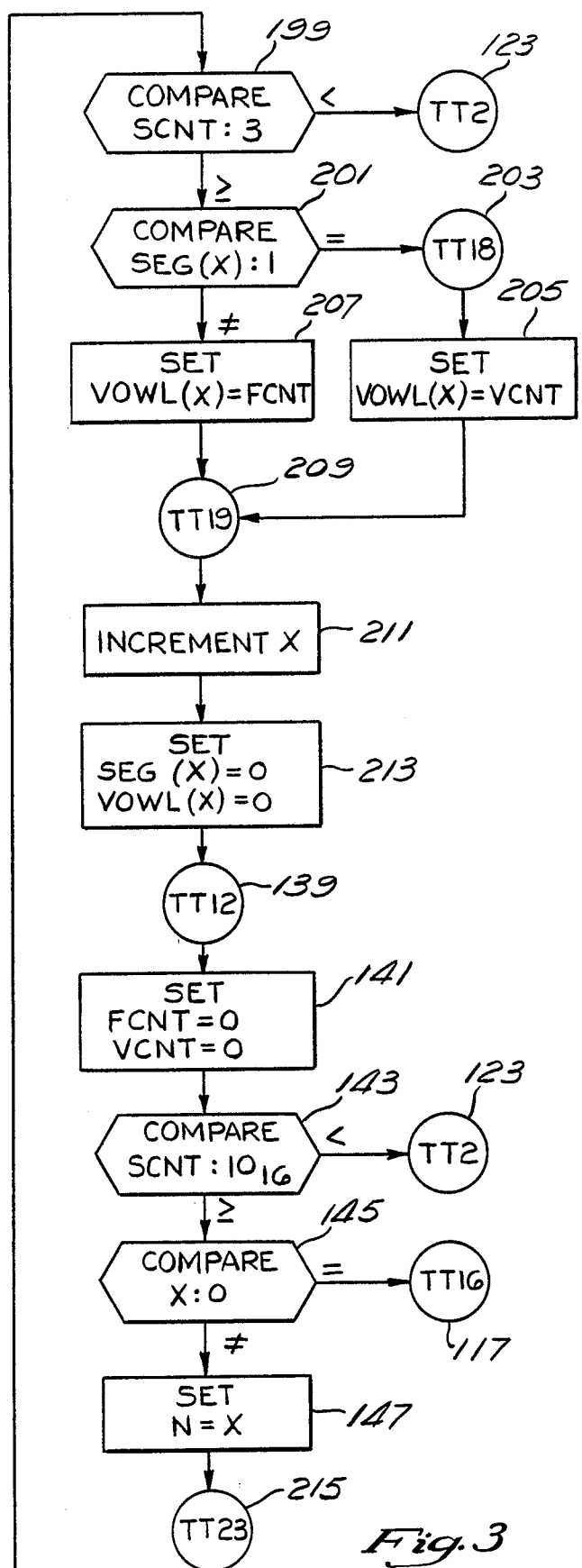
Fig. 3

SPEECH RECOGNITION SYSTEM BASED ON WORD STATE DURATION AND/OR WEIGHT

CROSS-REFERENCES TO RELATED APPLICATIONS

This is a continuation in part of an earlier application Ser. No. 259,695, filed May 1, 1981 and entitled Speech Recognition Microcomputer, issued on June 14, 1983 as U.S. Pat. No. 4,388,495. The above-referenced application is hereby incorporated by reference into the present application.

BACKGROUND OF THE PRESENT INVENTION

The present invention relates to speech recognition computers, and more particularly to speaker independent recognition computers. Specifically, this invention relates to a microcomputer used for speaker independent speech recognition with a carefully selected vocabulary which may be manufactured at extremely low cost for specialized applications.

Use of computers to recognize human speech has developed over the last 30 years to provide increasingly complex computerized systems capable of recognizing increasing vocabularies. In addition, substantial effort has been based upon a spectral analysis of the incoming voice signals through the use of a bank of band pass filters, each selecting a different frequency band, as a system front end. The signal levels or voice power in each of the band pass filter ranges has typically been sampled at periodic time intervals to provide a frequency vs. time speech matrix for words or phrases. A variety of time normalization techniques have been utilized to recognize words regardless of their time duration, and frequency normalization techniques have been used in attempts to achieve speaker independence.

All of this development, of course, has generated increasingly complex and expensive equipment, placing the advantages of speech recognition beyond the price range for most consumer products. In essence, speech recognition computers have been limited to laboratory tools and input systems for complex equipment, systems having a high enough cost to justify the expense of complicated speech recognition systems as an input medium.

With this development, the utility of a simplified speech recognition device for a variety of consumer products has been overlooked. Furthermore, the techniques utilized for more complex systems do not lend themselves to relatively simple speech recognition systems, since the storage requirements alone for most recognition systems is so substantial that the cost of the memory itself places the systems beyond the reach of the consumer market.

While other systems have recognized the utility of spectral analysis for speech recognition, these systems have attempted to discern relatively similar elements of speech, such as the vowels U and O and the plosives T and B, in order to broaden the system vocabulary.

SUMMARY OF THE INVENTION

The present invention is an improvement over the speech recognition microcomputer of the co-pending application Ser. No. 259,695 filed May 1, 1981. Both the parent application and the present application involve the provision of a low-cost speaker-independent speech recognition microcomputer. In the case of the device disclosed in the parent application, it became clear after tests that although substantial speaker independence was possible, when two speakers were so different in the way they spoke that one speaker did not voice portions of certain words that the other speaker did voice, the computer was unable to recognize them both as the same word unless a series of additional stored word templates were added. The microcomputer of the instant invention permits recognition of the same word without the need for additional stored word templates, even when the word is spoken in substantially different ways.

The speech recognition device of the present invention takes a spoken word and divides the word into a series of short, preferably ten millisecond, word portions. The average frequency of the spoken word during each of the ten millisecond word portions is determined by counting the number of times which the audio signal pattern, crosses a threshhold level. This count is referred to as the zero crossing count. Each ten millisecond word portion is then classified based on its average frequency as fricative-like, vowel-like, or silence. Generally, if the frequency is a higher frequency, the word portion will be classified as fricative, if it is a medium frequency, the word portion will be classified as vowel-like, and if it is a low or zero frequency, the word portion will be classified as silence.

As the computer collects and classifies these word portions, it constantly checks to determine whether there are enough proximately located short word portions classified in one of the three possible classifications such that a set of word portions can be grouped together into a word state of a given classification. Once it has determined that a word state exists, the classification of that state and the length (time duration) of the state is stored by the microcomputer. The microcomputer then continues to take ten millisecond samples of the spoken word, classify them and determine whether a state should be recognized or not.

After some non-silent states have been recognized and stored along with their respective lengths, the computer continuously tests for the end of the word. The end of the word is determined when a long enough string of ten millisecond portions have been classified as silence. For example, in the preferred embodiment of the present invention, 16 successive ten millisecond word portions classified as silence are required before the microcomputer will find that the word has been completed.

As soon as there is an indication that a completed word has been entered into storage, the microcomputer immediately compares the array of states which have been collected from the input spoken word with a series of word templates permanently stored in the microcomputer. It is this comparison process which permits recognition of words as the same even though spoken quite differently by different speakers. A simple example will illustrate this point. Assume that it is desired to recognize the spoken word "lights". The word "lights" when spoken into the microcomputer of the present invention, will often result in an array of three states. The first state is vowel-like, the second state is silence and the third state is fricative-like. However, some people pronounce the word "lights" as "lice". The resulting state array will have only two states, first a vowel-like state and secondly a fricative-like state. The silence state which normally occurs as the "t" sound is being formed has been omitted. However, since the silence state is not absolutely required to identify the word (in this example), the present system permits word recognition whether the three-state array, vowel-silent-fricative, or the two-state array, vowel-fricative, is found.

One way to provide this flexibility would be to add more templates to cover each of the different possible input state arrays that the computer must recognize as a given word. However, for any word which has a large number of variations among speakers, storage capacity becomes a problem.

The solution of the present invention is to store three arrays in each template for each word that the microcomputer is intended to recognize. The first array is a list of all possible word states for the given word. These word states are grouped in the order that they would occur in a given speaker's speech. However, in many cases there will be more word states in the template word state array than actually will be found in the word state array determined by the computer after analysis of the spoken word. This is illustrated in the above example where the person who says the word "lights" as "lice" will find that the computer registers his word "lice" with just an array of two states (vowel-fricative). The word state array of the word template for "lights" will, however, include all three possible states, vowel-silence-fricative.

The second array in the template is a series of weights or value numbers assigned to each state of the template's word state array. Higher weights are given for states that are very important in recognition of the given word, and lower weights are given to states whose recognition is not so important in the given word. In the above example, the original vowel-like and final fricative-like states would be assigned higher weights, while the less important central silence state would be assigned a lower weight.

The Third array provides a number for each state which indicates the length of time that an average speaker spends in voicing the particular state. For example, in the word "lights" it has been found that the average speaker spends 220 milliseconds in the vowel-like state, 20 milliseconds in the silence state and 120 milliseconds in the fricative-like state.

As stated above, after a state array has been formed for an unknown input word, the computer then compares the elements of the template arrays with the elements of the input speech array. As mentioned previously, the input word has a word-state array indicating the classification of each state of the word and a length array indicating the amount of time that the speaker has voiced each separate state. Starting with the first template in the series of templates representing the vocabulary of the microcomputer, the computer will first compare the first state of the input spoken word with the first state of the first template word. If the classifications of the first states are the same, the computer calculates the absolute difference between the average length for that state and the actual spoken length for that state. This value is then added to the amount already stored in a variable labeled SCORE. If this is the first state being compared for the word, the variable SCORE will have been previously set to zero.

If, on the other hand, the first state of the template does not have the same classification as the first state of the incoming word, then the value in the weighting array corresponding to the first state, will be added to the variable SCORE.

After the comparison of the first state has been made, the computer compares the second state. If the classifications of the first state in the word template and the first state in the incoming word state array were the same, then the microcomputer will compare the second state of the incoming word state array with the second state of the template array. If the classifications are the same, once again the absolute value of the length difference is added to the variable SCORE. If there is no match, the weight assigned to the second state of the template word array will be added to the variable SCORE.

If the classifications of the first state did not match originally, the computer will then compare the second state of the template array with the first state of the incoming word state array. This mismatch in the state number for the second comparison is due to an assumption that the original state mismatch was due to a missing state in the incoming word state array. If there is a match this time, the absolute value of the difference between the lengths will be entered into SCORE and if there is no match between the classifications, the weight assigned to the second state of the template word array will be added to the variable SCORE. This process continues until the end of the template word or the end of the incoming word array is reached. If the end of the template array is reached first, then the length of the remaining states in the incoming word state array are added together and added to the variable SCORE. If any one of these lengths are under a given threshold level, a default value is substituted and added up along with the other lengths. If the end of the incoming word state array is reached first, then the weight corresponding to the remaining states in the template word are added together and added to the variable SCORE.

After completing the comparison of the input word state array with the template arrays of the first template word, the computer compares the incoming word state array with the second template array. After a comparison similar to the comparison described above, the value of the variable SCORE is compared with the previous values for the variable SCORE and the template corresponding to the lower value is indicated tentatively as the proper word. After all the templates in the microcomputer have been compared to the incoming word state array, the template with the lowest SCORE value is indicated as the most likely word to be recognized. The value of the variable SCORE for this template is then compared with a previously determined threshold value. If the value exceeds this threshold value, the word is rejected and no word is recognized. However, if the value is lower than the threshold value, the word is recognized as the word corresponding to the template having the lowest value for the variable SCORE.

In the case of the word "lights", the stored template would have three arrays. The first array would have three states. The states would be vowel-like, silence and fricative-like. The corresponding weights selected for each state would depend on the importance that the programmer has assigned to each of the states. In situations where the pronunciation "lice" is to be recognized for the word "lights", the second state will be assigned a low weight. Thus, for example, a weight array might be 10, 7 and 10. As mentioned above, the average length for these states is determined empirically. Thus, the length array may be 22, 2, 12. These numbers are in units of 10 milliseconds in the preferred embodiment. If the incoming word was spoken by a person who pronounces the word "lights" as "lice", then the incoming word state array would have two states, one vowel-like and one fricative-like. Assuming that the length of the states are average, (in other words that the length corresponding to the vowel-like state was 220 milliseconds and the length corresponding to the fricative-like state was 120 milliseconds) the length array for the incoming word will be 22 and 12. Thus, when this incoming word state array is compared with the template arrays for the words "lights", the following results would occur. The first state in the template would be compared to the first state in the incoming word and the classifications would be found to be identical. The computer would then compare the lengths and they too would be identical. Thus, the amount added to the variable SCORE would be zero. The next step would be to compare the second state in the template with the second state in the incoming word state array. Because the classifications of the two states are different, the weight of the second state (i.e. 7) of the template would be added to the variable SCORE. The microcomputer would then compare the third state of the template with the second state of the incoming word. Because these states are of the same classification and also of the same length, no additional values would be added to the variable SCORE. The result is that the value of the variable SCORE for the word "lights" pronounced "lice" would be 7. If the other vocabulary words in the microcomputer template arrays are set up properly, this should be the lowest score and beneath the threshhold value. The computer would then indicate that the word "lights" has been recognized.

Thus, a low-cost speech recognition microcomputer is disclosed which permits recognition of the same word when spoken by different speakers having substantially different pronunciation.

BRIEF DESCRIPTION OF THE DRAWINGS

These and other advantages of the present invention are best understood through reference to the drawings in which:

FIG. 1 is a graph of zero crossing counts on a 10-millisecond base versus sign wave frequency;

FIG. 2 is a block diagram of a circuit of the present invention;

FIGS. 3 through 8 are flow charts showing the operation of the system of the present invention.

DETAILED DESCRIPTION OF THE PREFERRED EMBODIMENT

Figure 4:
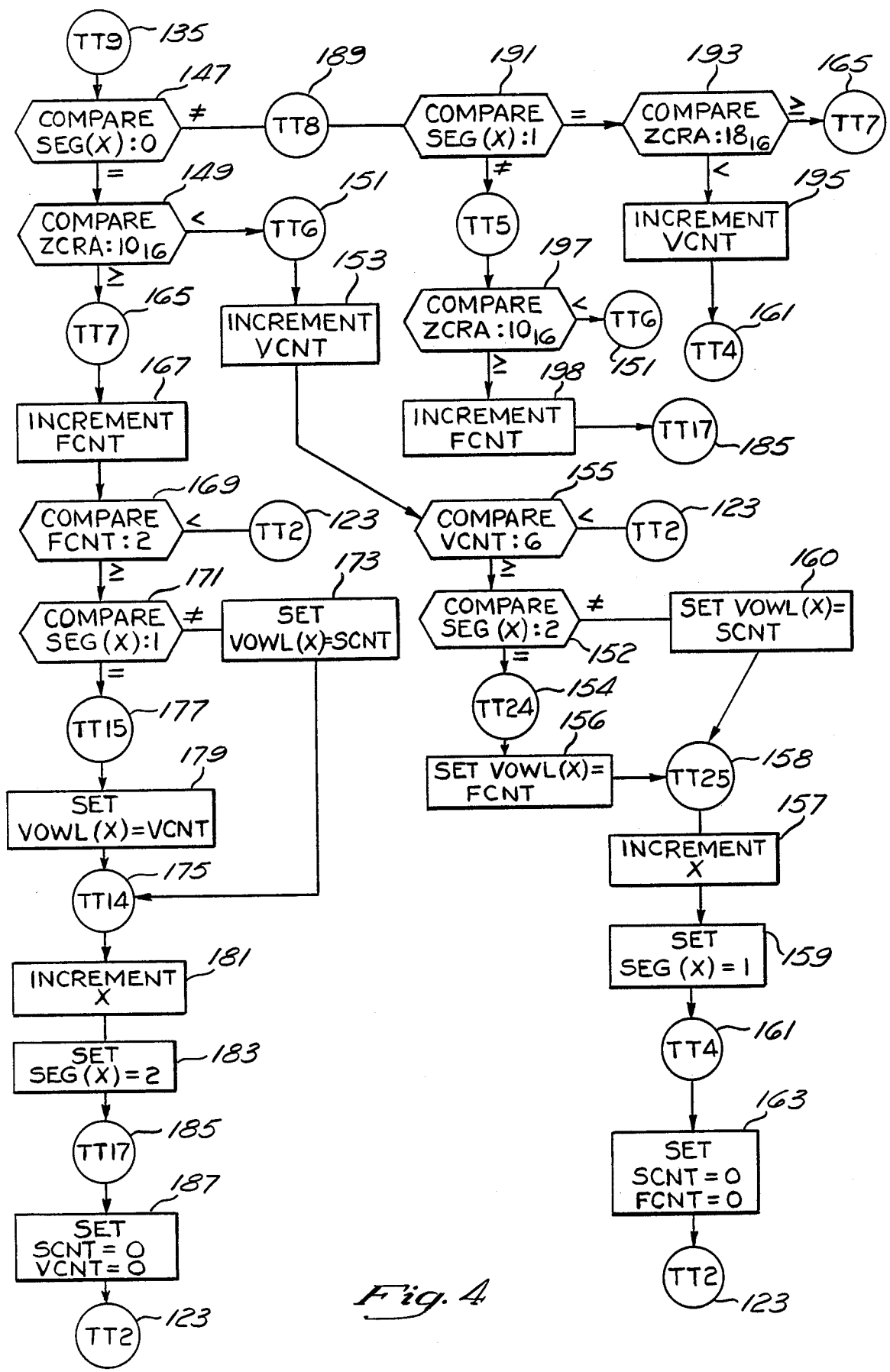

Referring initially to FIG. 1, it will be seen that if an incoming speech signal is sampled on a 10-millisecond base, a sine wave frequency of one kilohertz will yield ten positive-going zero crossing counts per 10 milliseconds. Likewise, a frequency of five kilohertz will generate fifty positive-going zero crossing counts per 10 milliseconds, assuming that the zero crossing threshold is anywhere between the peaks of the sensed sine wave. If, in measuring a speech pattern, an amplifier is used which is hard limited, virtually all speech patterns will saturate the amplifier and generate a zero crossing count. Thus, the ultimate count realized by monitoring the electrical signal from a hard limited amplifier provides an average frequency measurement. In the system of the present invention, as shown in block diagram in FIG. 2, a microphone 11 provides an audio signal input to a high gain audio amplifier 13 which is saturated such that all speech signals generate zero crossing data. This signal is supplied on line 75 to the timer input of a microcomputer chip 17, such as an MC6805P2 microcomputer chip manufactured by Motorola Semiconductors. This timer input 75 senses negative going signals at a threshold voltage of 0.08 volts such that, if the audio amplifier 13 provides a 5-volt output at saturation, the input to the timer will occur at a frequency equivalent to the average spectral frequency of the voice signal supplied to the microphone 11.

Within the microcomputer 17, a read-only memory 19 includes firmware for the speech recognition system, as well as firmware speech templates for the words to be recognized. Thus, the predetermined selected vocabulary which the speech recognition system is to interpret is permanently stored in the read-only memory 19 at the time of manufacture of the microcomputer 17, or at least prior to the sale of the microcomputer 17. There is thus no vocabulary training during use of this speech recognition device, and its task is therefore dedicated at the time of original manufacture in order to present the vocabulary to a group of recognizable words and to make it possible to inexpensively produce the speech recognition sytem.

In accordance with the firmware stored in the read-only memory 19, the speech recognition system of FIG. 2 analyzes incoming speech data from the microphone 11 in accordance with a process which is diagramed in the flow charts of FIGS. 3 through 8.

Referring initially to FIG. 3, the system is initialized at step 111 when power is initially supplied to the microcomputer 17. This initialization designates the ports A, B, and C; 21, 23, and 25, respectively, of FIG. 2, as output ports for the device. It will be recognized that each of these ports 21–25 can operate as an input or an output for the microcomputer 17, and designation of these ports permits output data resulting from speech recognition to be provided at any of the ports A, B, and C. This designation occurs at step 113 and thereafter variables stored in registers in a random access memory 27 of the microcomputer 17 are initialized at step 115. The flow chart of FIG. 3 and the remaining flow charts of FIGS. 4–8 include return points such as the return point TT16, 117, which permit return of the sequence, as from a branch point, to various jump points within the flow chart.

The variables which are initialized at step 115 include the following: FCNT is a fricative-like count and defines the number of 10-millisecond intervals which have predominantly high frequency sound energy. VCNT is a variable used to count vowel-like 10-millisecond intervals having predominantly lower frequency speech power. SCNT is a variable used for counting 10-millisecond silence intervals having virtually no speech content. X is a pointer variable used for identifying, by number, the successive states and their associated classifications (fricative-like, vowel-like, or silence) within a state sequence used to identify a speech pattern. The variable N defines the total number of states for an income word.

At step 119, a pair of arrays are initialized. Array SEG(X) contains the actual state sequence for an incoming word, that is, data for each segment X identifying each segment as fricative-like, vowel-like, or silence. The array VOWL(X) defines the length of a state, that is, the number of 10-millisecond periods within a segment X identified as a specific state.

These variables and arrays may be better understood through the following table:

TABLE 1

| SEG(X): fricative-like | | | = 2 | |
|---|---|---|---|---|
| vowel-like | | | = 1 | |
| silence | | | = 0 | |
| Word: SIX | | | | |
| X | 1 | 2 | 3 | 4 |
| SEG(X) | 2 | 1 | 0 | 2 |
| VOWL(X) | $Q_1$ | $Q_2$ | $Q_3$ | $Q_4$ |
| N = 4 | | | | |

From the above table it can be seen that SEG(X) is defined as 2 for a particular state within a word if that state is fricative-like, that is, primarily high-frequency acoustic energy. Similarly, if the word state is primarily vowel-like, SEG(X) is defined as 1, while a 0 defines a silence state. As shown above, for the word six, in a typical pronounciation, there are four successive states such that N is equal to 4. For values of X from 1 to 4, SEG(X) is the sequence 2 1 0 2, or fricative-like, vowel-like, silence, fricative-like. The initial "S" of the word six provides the fricative-like state where "X" equals 1. The vowel in the word six provides the vowel-like state where X equals 2. Prior to the formation of the X sound in the word six, the vocal passage, in storing energy for sounding the fricative X, closes to produce a momentary silence defined at X=3 by SEG(X)=0. This short silence is followed by the fricative-like X sound at X=4, shown by SEG(X)=2.

The array VOWL(X) stores the values $Q_1$, $Q_2$, $Q_3$, $Q_4$ defining the duration of each state of the word six.

As will be better understood through the description which follows, in order to define, for example, the fricative-like state at X=1 or X=4, the fricative-like sound energy must have a predetermined duration. This duration is measured by the variable FCNT which counts 10-millisecond time periods during which the fricative-like energy occurs. Similarly, the vowel-like state at X=2 in the example above, requires that a vowel-like average frequency exist for a predetermined duration, which is stored using the variable VCNT. A variable SCNT is used to count silence duration in a similar manner.

Returning now to the sequence illustrated in FIG. 3, following the initialization of variables and arrays at steps 115 and 119, the zero crossing counter 31 within the microprocessor 17 is started at step 121. This allows the counter 31 to increment each time the output signal from the high-gain audio amplifier 13 crosses the threshold point of a prescaler 33, in this example 0.8 volts. A return point TT2 is shown at 123 in FIG. 3 and is used, as described above, to provide looping within the system. At step 125 a delay of 10 milliseconds is initiated immediately after the zero crossing counter is started at step 121. This 10-millisecond delay is measured by the timer 31 and timer control 35 shown in FIG. 2. At the end of this 10-millisecond delay, a variable, ZCRA, stored in the ram 27 of FIG. 2, is made equal to the count within the counter 31, that is, the total zero crossing count for this 10-millisecond period. With this value stored, as shown at step 127, the zero crossing counter 31 is immediately reset and started again at step 129, so tha the zero crossing data for the next 10-millisecond period can be accumulated while the zero crossing data from the first 10-millisecond period, stored as the variable ZCRA in the ram 27, is analyzed. The microprocessing system is fast enough to permit the entire remaining portion of processing, as it relates to the first 10-millisecond time data, to be completed before the end of the 10-millisecond delay at step 125. Thus, as will be seen in the description which follows, after this initial 10-millisecond data is analyzed, the program will return to point TT2, 123 to wait for the end of the next 10-millisecond period at step 125, so that the next zero crossing count can be recorded at step 127.

The first step in analyzing the incoming zero crossing count is to compare this count with two. If the zero crossing count is below two, as shown in FIG. 1, the primary energy entering the system on line 75 is below 200 hertz, or non-existent in the case of no zero crossings. This is interpreted as a silence period. Thus, the comparison which occurs at step 131 defines a flow chart branching step, directing the continued processing to step 133 if the zero crossing count is less than two, and directing it to looping point TT9, 135, if the zero crossing count exceeds two. In other words, if, during this 10-millisecond period, the incoming signal on line 75 (FIG. 2) indicates silence, the sequence will continue at step 133. If, on the other hand, recognizable sounds are present, the program will jump to TT9, 135.

If we assume that for this particular 10-millisecond period the zero crossing count, stored in the ZCRA register location, is less than two, indicating silence, Step 133 increments the variable SCNT, the silence counting variable, so that this variable now equals one, indicating one 10-millisecond period of silence. As will be seen in the description which follows, the variable SCNT is used to count the total number of 10-millisecond silent increments to determine whether an actual silence state exists. At the point of the sequence presently being described, of course, if the entire process is just beginning, this initial silence increment indicates that the speech sound to be recognized has not yet begun. This fact is determined, at Step 137, which compares the value SEG(X) with zero to determine whether the current segment, that is, the most recent state that has been monitored, is equal to zero, or silence. Since, in our example at the beginning of program operation, SEG(X) was made equal to zero at Step 119, the branch Step 137 will direct the sequence to continue at point TT12, 139. This return point TT12, 139 provides a jump in the sequence to return point 139 shown later in the flow chart of FIG. 3. Since, as previsouly noted, we are currently in a silence state and have measured another silence increment, and have incremented the silence count at Step 133, the FCNT variable and VCNT variable are set to zero at step 141. The total silence count is next compared with the nexadecimal numeral 10, at Step 143, this numeral equaling 16 decimal. In essence, this Step 143 determines whether the silence count has reached 16, indicating a total silence duration of 16 times 10 milliseconds, or 160 milliseconds. If the silence count is less than 16, the program branches to return point TT2, 123, which was previously described, to acquire more zero crossing, 10-millisecond data. If however, there are 16 silence counts, the sequence will continue at Step 145.

At Step 145, the variable X is compared with zero to determine whether any states have been recorded for this word. Essentially, this Step 145 is a test to determine whether the sequence is still waiting for the initial portion of a word. If X is equal to zero, the program returns to return point TT16, 117 where the variables and arrays are again initialized at Steps 115 and 119 and data collection resumes at Step 121.

At some point in time, after the program has been continuously looping through the above-described sequence, reinitializing itself each 160 milliseconds of silence, a word is spoken, providing the initial meaningful zero crossing data on line 75 (FIG. 2). At the point in time when a 10-millisecond sampling period yields a ZCRA zero crossing count in excess of two, the Step 131 will branch the program to return to point TT9, 135. This return point TT9, 135 is shown as the initial step in FIG. 4.

FIG. 4 is only entered at point TT9, 135 when the current sample indicates that the incoming speech on line 75 (FIG. 2) is not silence. It must now be determined whether the sound is fricative-like or vowel-like in this 10-millisecond interval. This test is initiated at the branch Step 147 which compares the current state SEG(X) with zero. If, in the present example, the sequence is at the beginning of a speech sound, it will be recalled that SEG(X) had been set to zero at Step 119 and thus the sequence will continue at branch Step 149. At this step, the zero crossing count, ZCRA, is compared with hexadecimal 10, or decimal 16. If the zero crossing count is less than 16, and more than 2, as was determined at Step 131, the average frequency during the 10-millisecond period being examined, as shown in FIG. 1, is above 200 hertz, and below 1600 hertz, and is interpreted as a vowel-like sound. Thus, after passing a return point 151, the Step 153 increments the variable VCNT, which is used to count vowel-like 10-millisecond intervals. At Step 155, the value of the variable VCNT, that is, the total number of vowel-like 10-millisecond intervals, is compared with 6, to determine whether there have been 60 milliseconds of vowel-like intervals. In the present example, the branch Step 155 would indicate that, since we are just beginning a word, the value VCNT would have been incremented to one at Step 153, and the sequence is returned to return point TT2, 123, to collect additional 10-millisecond input data. Thus, no state has yet been recognized, since a single 10-millisecond sampling period is insufficient to define a vowel-like state. However, the variable VCNT has been incremented so that we can continue to count vowel-like 10-millisecond periods to determine if this word actually begins with a sound which has its primary energy at a frequency between 200 and 1600 hertz.

If we now assume that, by returning to return point TT2, 123, five additional times, each time following the sequence described above so that the Step 153 has incremented the variable VCNT to the value 6, the sequence will continue to step 152. In step 152 we compare SEG (X) with the value 2 to determine what the classification of the previous word state was. The reason for this is that we now want to determine what the length of that word state was. If the previous word state was fricative, we will find that SEG (X) is equal the 2, go through return point TT24, 154, to step 156 where VOWL (X) is set equal to FCNT and then we move to return point TT25, 158. If the previous state was silence, then SEG (X) will not be equal to two and we move to step 160 where we set VOWL (X) equal to SCNT and then move on to TT 25, 158. The next step is 157 where the pointer variable X is incremented, so that it now equals 1, identifying the first state within the word to be recognized. At Step 159, the first value of the SEG(X) is set to 1, indicating a vowel-like state for SEG(1).

Having defined the first state at Step 159, the program continues through return point 161, TT4, to Step 163 where the variables SCNT and FCNT are set to zero, in case there were intervening silence counts and fricative-like counts during the time period when 6 total vowel-like increments occurred, so that a new counting of SCNT and FCNT variables may resume, and the sequence is continued at return point 123 shown in FIG. 3.

If at the beginning of this word, a fricative-like sound, rather than a vowel-like sound, appeared on line 75 (FIG. 2), the branching test at step 149 would have yielded a zero crossing count in excess of hexadecimal 10, or decimal 16, indicating an average sound frequency in excess of 1600 hertz. In this instance, the sequence continues through return point TT7, 165, to Step 167 where the FCNT variable, which counts fricative-like 10-millisecond samples, is incremented. The variable FCNT is next compared with the value 2 at Step 169, to determine whether a total of 20 milliseconds of fricative-like sound has been monitored. If less than 20 milliseconds of fricative-like sound has been monitored since the last state definition, the program will return to point TT2, 123. If, however, the variable FCNT is equal to or greater than the value 2, the branching Step 171 determines whether the most recently defined word state was a vowel-like sound. In the example that we have been describing, it will be recognized that SEG(X) had been set to zero and thus the program would continue at Step 173 where the variable VOWL(X) would be set equal to SCNT and the program wouldreturn at point TT14, 175. In later instances, other then at the beginning of a word, it will be useful to store the total vowel count variable, VCNT, when a vowel-like sound precedes a fricative-like sound. Thus, if the test at branching Step 171 indicates that the state monitored most recently was a vowel, the program will continue through return point TT15, 177, to set a variable VOWL(X) equal to the value VCNT previously stored at the incrementing Step 153. This occurs at Step 179. The procedure will then continue through return point TT14, 175, to increment X at Step 181 in a manner similar to the previously-described Step 157, to define the next state in the SEG(X) array as a fricative-like sound, that is, two, at Step 183, similar to the Step 159 previously described, and will continue through return point TT17, 185. In a manner similar to the Step 163, previously described, the sequence at Step 187 then resets the variables SCNT and VCNT and returns the program to point TT2, Step 123, of FIG. 3, for the collection of additional data.

From the above description, it can be seen that if the previous state were silence, as was determined at branch Step 147, a total vowel-like duration of 60 milliseconds will define a vowel-like state and a total fricative-like duration of 20 milliseconds will define a fricative-like state as the first state of this word to be recognized.

In essence, what has been described thus far is a form of hysteresis in the system which requires that a predetermined state last through a predetermined time, 60 milliseconds in this case for vowel-like sounds and 20 milliseconds for fricative-like sounds following a silence, in order for the system to accept the incoming data as a particular state.

As will be seen in the description which follows, identification of the previous state is used to vary the frequency discrimination that is used for determining whether a particular sound is vowel-like or fricative-like. Thus, at Step 149, because the previous state had been defined at Step 147 as silence, frequencies in excess of 1600 hertz were defined as fricative-like. As will be seen from the description which follows, if the most recently defined state were a vowel, a particular 10-millisecond interval will not be defined as fricative-like, unless the average frequency content of the interval exceeds 2400 hertz. This is an additional form of hysteresis which makes it more difficult to recognize a fricative-like sound following a vowel than a fricative-like sound following silence, since it has been found tha error rates are reduced if the threshold for passing from a vowel-like sound to a fricative-like sound is increased. Thus, in addition to the basic hysteresis of the system generated by the fricative-like and vowel-like duration requirements at Steps 169 and 155, respectively, a variable hysteresis is introduced in the system by varying the frequency transition point between vowel-like and fricative-like 10-millisecond intervals, depending upon the previous word state.

The following sequence describes this hysteresis principle. If, at Step 147, it was determined that the most recently defined word state was not silence, the program sequence would continue through return point TT8, 189, to branch Step 191 where it would be determined whether the previous word state was a vowel-like sound by comparing SEG(X) with the value one. If the previous state were a vowel-like sound, the sequence would branch to Step 193 where the zero crossing count would be compared with the hexadecimal value 18, that is, decimal value 24, indicating a frequency average of 2400 hertz. If the value did not exceed 2400 hertz, the program would proceed to Step 195, incrementing the variable VCNT, identifying this 10-millisecond period as vowel-like, and returning the sequence to return point TT4, 161, previously described. If, on the other hand, at branch point 193, the frequency content exceeds 2400 hertz, the program would proceed to return point TT7, 165, previously described, and would increment the variable FCNT at Step 167. Thus, the frequency threshold for a fricative-like 10-millisecond period depends upon whether the previous recorded word state was a vowel or silence state.

It should be noted that the branch Step 193 is only reached if the previous state is a vowel-like sound, that is, the test conducted at Step 155 has already indicated that 60 milliseconds of vowel-like sound has occurred and the array SEG(X) has been set at Step 159 to indicate a vowel-like state. It is not desired, of course, to follow one vowel-like state with another vowel-like state since this would only be an indication of a relatively long vowel sound. Thus, the incrementing of VCNT which occurs at Step 195 and the return of the program to return point TT4, 161, simply allows an accumulation of successive vowel-like intervals once a vowel-like state has been defined until some other interval, silence or a fricative-like sound, is encountered, the additional vowel-like intervals not yielding an additional vowel-like state.

Similarly, at branch point 191, if the comparison of SEG(X) with one indicates that the previous state is not a one, and since the branch Step 147 has indicated that the previous state is not silence, the program will branch to Step 197 if the previous state identifies a fricative-like sound. In this instance, if the zero crossing data for the most recent 10-millisecond interval exceeds 16, this is registered as a continuation of the fricative-like sound which yielded the most recent fricative-like state and the length counter FCNT is incremented in Step 198. The program then branches to return point TT17, 185, previously described, to allow the program to accumulate additional fricative-like 10-millisecond intervals without yielding an additional fricative-like state. Two successive fricative-like states would erroneously indicate two fricative forms within a word in successive positions rather than a relatively long fricative-like sound. If, on the other hand, the previous state were a fricative-like sound, and the most recent 10-millisecond interval sample yields a frequency average below 1600 hertz, the branch Step 197 will return the program to return point TT6, 151, previously described, to identify the beginning of a vowel-like sound.

It is important to recognize that following Step 195, the continuation of a vowel-like count beyond the count 6, defined at Step 155, the program returns at return point TT4, 161 to set the variables SCNT and FCNT to zero so that occasional silence-like intervals and fricative-like intervals in the middle of a vowel-like sound will not accumulate, to erroneously indicate a silence state or fricative-like state, unless these 10-millisecond samples occur successively. Thus, so long as a single fricativelike or silence sample interval occurs in the middle of a vowel-like counting sequence, the variables SCNT and FCNT will be zeroed to prohibit accumulation of non-sucessive counts of these variables.

A similar sequence occurs at return point TT17, 185, resetting the variables SCNT and VCNT at Step 187, so long as fricative-like sounds are occurring and only isolated silence intervals and vowel-like intervals occur.

Returning again to FIG. 3, it will be recalled that the sequence branched to return point TT9, 135, from branch Step 131 if some sound was present, indicating a non-silence interval, and that, at Step 137, the sequence branched to return point TT12, 139, if a silence interval was at the beginning of a word. If, at branch Step 137, it is determined that the most recent recorded word state is not silence, and since at Step 131 we have determined that the current 10-millisecond sample interval is a silence state, the sequence will branch to Step 199, where the current value of the variable SCNT will be compared with the value 3. That is, a determination will be made as to whether the silence duration has exceeded 30 milliseconds, a sufficient time period to capture the short silent states within words, such as the preplosive-like closure of the vocal passage during which vocal energy is stored for the plosive-like sound. If the variable SCNT does not exceed 3, the program branches to return point TT2, 123, to collect more interval data. If the variable SCNT exceeds the value 3, the program will continue at branch Step 201 to test whether the most recently recorded word state is a vowel-like sound. If the last state prior to a silence state is a vowel-like state, the program continues through return point TT18, 203, to Step 205 where the variable VOWL(X) is set equal to the variable VCNT which was previously set to equal the total duration of the vowel-like sound at Step 179 (FIG. 4). If the most recent state was a fricative-like sound, the branch Step 201 would continue the program to Step 207, which stores the length of fricative-like state, FCNT, in the variable VOWL(X). The sequence then continues through return point 19, 209 to the Step 211 where the value X is incremented and, because the silence count variable SCNT has exceeded 3 (Step 199), the variable SEG(X) is set to define a silence state at Step 213. At the same time, the variable VOWL(X) is reset, this being the next successive location in the VOWL array after the location set at Step 205, due to the incrementing of X at Step 311.

As previously described, the Step 141 then resets the variables SCNT and FCNT, and a comparison is made at Step 43 to determine whether the total duration of silence, that is, the value of the variable SCNT, exceeds 16. Once the silence count has exceeded 160 milliseconds, a determination is made at branch Step 145 as previously described, whether previous word states have been recorded. If word states have been recorded, a silence duration of 160 milliseconds is defined as sufficiently long to indicate the end of a word and thus the program branches to Step 147 where the variable N, indicating the total number of states within the word, is set equal to the variable X, which now defines the total number of word states which have been recorded. At the completion of Step 147, the sequence continues through return point TT23, Step 215, to the sequence of steps diagramed on FIG. 5.

Figure 5:
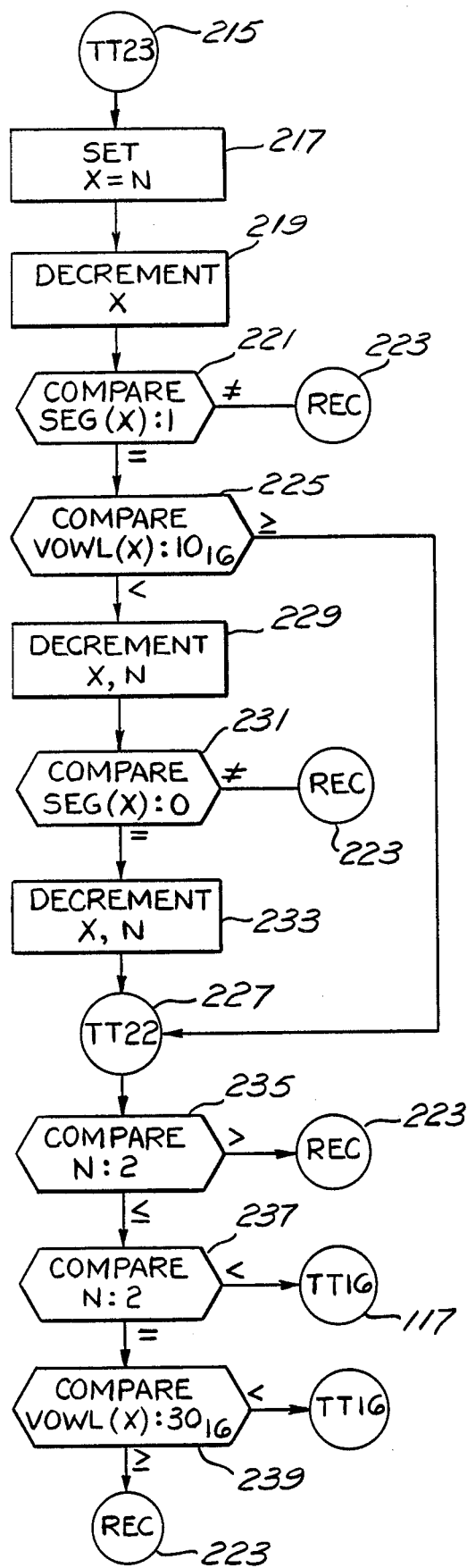

As will be seen from the following description, the sequence of steps of FIG. 5 is used to check the last recorded word state to determine if it was a short vowel-like sound. Since it has been determined that a short vowel-like segment at the end of a word is often an erroneous vowel indication, relating instead to the energy decay at the end of a fricative-like sound, the sequence of steps shown in FIG. 5 is used to eliminate from the state sequence such a short vowel-like ending sound.

Initially, the variable X is set to equal the variable N at Step 217 such that the variable X now indicates the last recorded state which, as has been noted, is silence because the sequencing has defined all words as ending with a silence state exceeding a 160 millisecond interval. At Step 219, the variable X is decremented to identify the next previous word state prior to the ending silence. This next previous word state is identified at Step 221 by comparing SEG(X) with the value 1 to determine whether this next previous word state was a vowel-like sound. If it is not a vowel-like sound, the program branches to return point REC, 223, shown in FIG. 6. If, on the other hand, the last word state recorded prior to the ending silence is a vowel-like sound, the branch Step 225 compares the total duration of that vowel-like sound with 160 milliseconds by comparing the variable VOWL(X), set at Step 205 (FIG. 3), with the value hexadecimal 10, or decimal 16. If the vowel-like sound exceeded 160 milliseconds, the sequence continues at return point TT22, 227. If, on the other hand, the ending vowel-like sound was shorter in duration than 160 milliseconds, it has been determined that this is a false ending vowel. For this reason, Step 229 is used to decrement both the variables X and N to effectively eliminate this erroneous state. Step 231 is then used to determine whether a silence state occurred immediately before the erroneous ending vowel-like state. If a silence state did not precede this erroneous vowel-like state, the sequence continues at the return point REC, 223. If, however, a silence state did precede the erroneous vowel-like state, the silence state is also erroneous, and thus, at Step 233, the values X and N are again decremented to eliminate the erroneous silence states.

Figure 6:
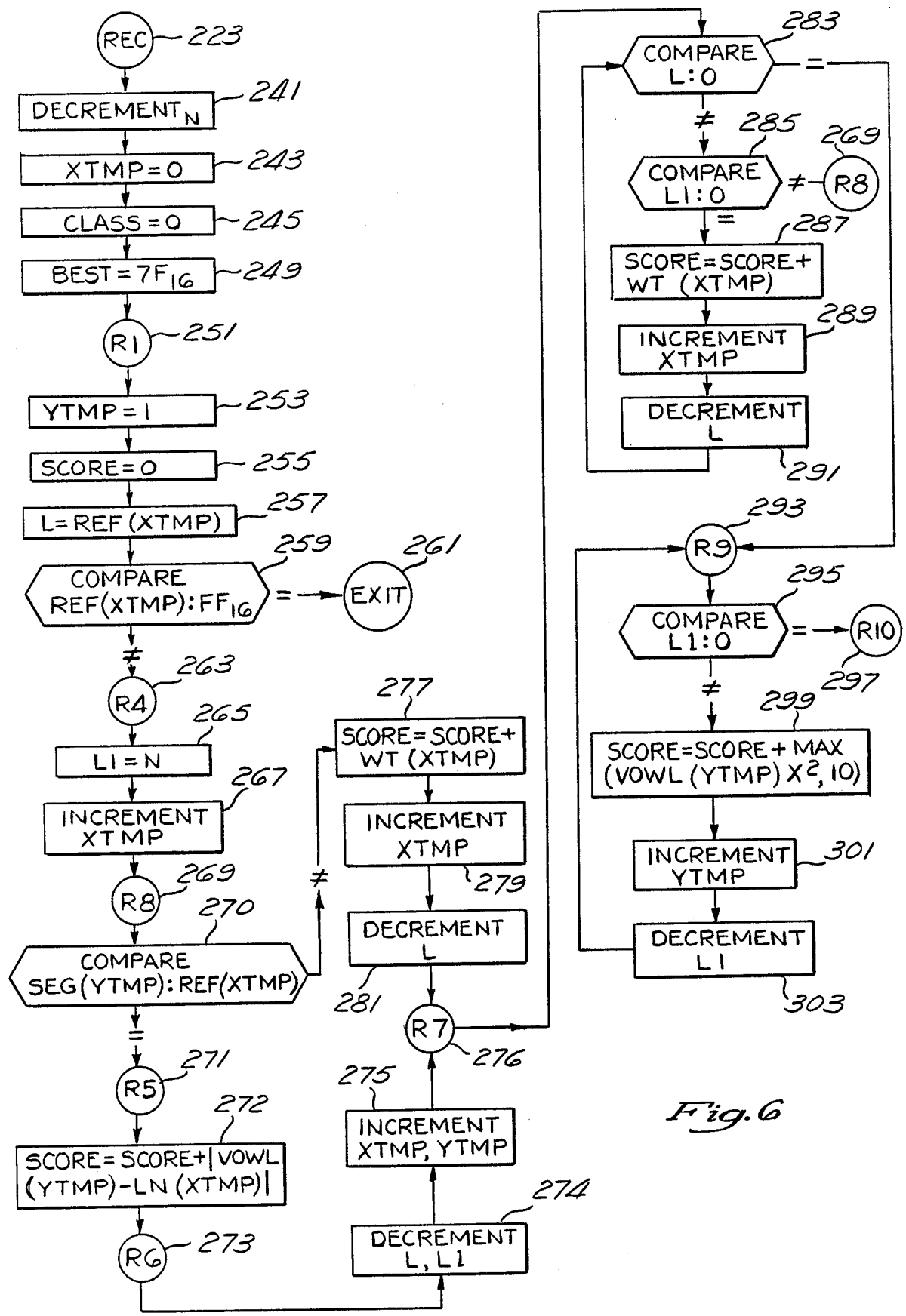

Although the array SEG(X) has not been reset to physically eliminate the recorded erroneous states, the decrementing of the value N, as will be seen through the description of FIG. 6, effectively eliminates these erroneous states from participating in the word recognition sequence.

Having thus eliminated the erroneous ending states, the program continues from return point 227 to branch Step 235 which compares the variable N with the value 2. It should be recognized that the variable N is one greater than the actual number of meaningful states within the state sequence, since the last state recorded is the silence state at the end of any word. Thus, the comparison of N with 2 determines whether there was more than one meaningful state within the state sequence. If the variable N exceeds 2, a meaningful state sequence has been defined and the sequence of steps branches to Step 223, FIG. 6. If the value of N is less than or equal the the value 2, Step 237 compares the value N with the value 2 again to determine whether the value is 1 or 2. If the value is less than 2, we have essentially removed the entire state sequence, since the single state will be the silence at the end of the word and there will be no meaningful state sequence. Thus, the program is returned at return point 117, TT16, to FIG. 3.

If at branch Step 237, it is determined that the value of N is 2, so that there is one meaningful word state within the word, the value of the variable VOWL(X) is compared with the value hexadecimal 30 or decimal 48, indicating a vowel-like duration of 480 milliseconds at Step 239. Since there is only a single vowel-like state in the word, the sequence requires that the vowel-like state have a duration of at least 480 milliseconds in order for this state, by itself, to be meaningful. If the duration is less than 480 milliseconds, the sequence returns to TT16, Step 117, FIG. 3 for reinitialization. If, on the other hand, the vowel-like state duration exceeded 480 milliseconds, the sequence continues to return point REC, Step 223, FIG. 6. It should also be recognized that, if the single state sequence includes only a fricative-like sound, the Step 187 (FIG. 4) would have set the value VCNT to zero. Therefore, the branch Step 239 will effectively eliminate a single fricative state sequence, returning the program to return point TT16, 117, to reinitialize the sequence.

Referring now to FIG. 6, a recognition sequence is diagrammed which begins at return point REC, 223. This sequence is utilized for comparing the new word defined by the state sequence stored in the array SEG(X) and the state lengths as stored in the array VOWL(X) described previously with plural word templates permanently stored in the read-only memory 19 of the microprocessor (FIG. 2). The templates are stored in arrays identified as REF(XTMP), WT(XTMP) and LN(XTMP) in the following format:

TABLE 2

| Word: | SIX | First Template | | | | | Next Template | | | |
|---|---|---|---|---|---|---|---|---|---|---|
| | XTMP | 0 | 1 | 2 | 3 | 4 | 5 | 6 | 7 | 8 | 9 |
| | REF(XTMP) | 4 | 2 | 1 | 0 | 2 | | | | | |
| | WT(XTMP) | 0 | $W_1$ | $W_2$ | $W_3$ | $W_4$ | | | | | |
| | LN(XTMP) | 0 | $Q_1$ | $Q_2$ | $Q_3$ | $Q_4$ | | | | | |

A pointer XTMP is used to define successive memory bytes in the arrays. Each word template within the readonly memory 19 begins with a designation of the number of states in the word template. In the example given above in Table 2, the number of states is 4, stored at REF(0). This initial designation is followed by the sequence of states within the word template. In this case, similar to Table 1 above, a typical template for the Engligh word six is stored as the following sequence: fricative-like, vowel-like, silence, fricative-like; that is, 2102; stored at locations XTMP=1 through 4. If the template had been a three state template, the initial location REF(0) would have been the numeral 3, and only three state identifiers would have followed at XTMP=1 through 3.

The array WT(XTMP) contains weights assigned to each reference state proportional to both the probability of occurrence of that state over a population of speakers and that state's usefulness in differentiating that word from other words in the vocabulary. The array LN(XTMP) contains the average length (duration) of each state.

As shown in Table 2, the next successive word template follows immediately after the first word template at locations REF(5) and following, with the number of states of this next template stored at REF(5). Each of the templates is thus successively stored in the read-only memory at successive locations XTMP, although the state sequence templates may have different lengths.

A pointer YTMP is used to define the successive elements of the incoming spoken word array. In comparing a spoken word consisting of the arrays SEG-(YTMP) and VOWL(YTMP) to a stored word pattern consisting of the arrays REF(XTMP), WT(XTMP) and LN(XTMP), a state-by-state comparison is made. That is, the first state of the stored word pattern, contained in array REF(XTMP) is compared with the first state of the new word, contained in array SEG(YTMP) If they both have the same classification the variable "SCORE" is increased by the difference in the state lengths contained in arrays VOWL(YTMP) and LN(XTMP). Both YTMP and XTMP are then incremented in preparation for the next state comparison. If the classifications of the first states are not the same, that is, the state expected according to array REF(XTMP) is missing in the new word, then the variable SCORE is increased by the weight associated with that state as contained in array WT(XTMP). The more important the state in differentiating between vocabulary words, the larger the weight and the more it affects the variable SCORE.

If the first state of the first template word stored at REF (1) is the same as the first state of the incoming spoken word state array stored at SEG(1), then both XTMP and YTMP are incremented to prepare for the next state comparison in the next comparison, the second state of the incoming spoken word state array SEG (2). Additionally, the microcomputer calculates the absolute value of the difference between the length of the first state of the first template, LN (1) and the length of the first state of the incoming word state array VOWL(1). This value is then added to the variable SCORE. If when the first state of the first template REF(1) is compared with the first state of the incoming word state array SEG(1) it is found that the classifications are different, then the value of the weight for the first state of the first template, WT (1) is added to the variable SCORE. Additionally, XTMP is incremented, but YTMP is not incremented to prepare for the next comparison. The microcomputer then compares the second state of the first template, REF (2) with the first state of the incoming spoken word state array, SEG (1).

If the classifications are the same then the absolute value of the difference between the length of the second state of the first template, LN (2) and the length of the first state of the incoming spoken word state array, SEG (1) is added to the variable SCORE. If the classifications are different, the weight of the second state of the first template, WT (2) is added to the variable SCORE.

When a match is found in REF(XTMP) for the state SEG(1), both YTMP and XTMP are incremented, and SEG(2) is compared with the next successive reference state.

If the end of the pattern REF(XTMP) is reached while more states remain in the input word sequence SEG(YTMP), the lengths VOWL(YTMP) of these excess states are added to the variable SCORE. If any one of these length values is less than 10, the value 10 is substituted when adding the lengths. On the other hand, if the end of the input word sequence SEG(YTMP) is reached while more states remain in the reference template pattern REF(XTMP), the weights of these excess states WT(XTMP) are added to the variable SCORE.

This procedure is repeated for each stored vocabulary word and the lowest value for the variable SCORE is chosen as indicating the closest match. If this score is less than or equal to a threshold derived from bits 2, 3, 4 and 5 of I/O port A 21, the variable CLASS which contains the number corresponding to the template word having the lowest SCORE is output on port B 23, bits 0-6. Otherwise the incoming word is rejected and a reject indication is provided on bit 7 of port B. Table 3 illustrates possible reject thresholds corresponding to bit patterns and derived from I/O port A 21 bit 2-5. In any given microcomputer only one of these reject thresholds would be used. The selection of the threshold depends on how important it is to the user that no errors be made. The less concerned the user is about errors, the higher the threshold will be, whereas if errors are likely to have a high cost, the threshold will be lower. If the application is control of a toy robot, the main thing is that the robot should do something in response to a command. The reject threshold in such an application would be high. On the other hand, if the application is industrial and an error might be costly, the reject threshold would be set low.

TABLE 3

| PORT A | Bit 5 | Bit 4 | Bit 3 | Bit 2 | Reject Threshold |
|---|---|---|---|---|---|
| | 0 | 0 | 0 | 0 | 64 |
| | 0 | 0 | 0 | 1 | 4 |
| | 0 | 0 | 1 | 0 | 8 |
| | 0 | 0 | 1 | 1 | 12 |
| | 0 | 1 | 0 | 0 | 16 |
| | 0 | 1 | 0 | 1 | 20 |
| | 0 | 1 | 1 | 0 | 24 |
| | 0 | 1 | 1 | 1 | 28 |
| | 1 | 0 | 0 | 0 | 32 |
| | 1 | 0 | 0 | 1 | 36 |
| | 1 | 0 | 1 | 0 | 40 |
| | 1 | 0 | 1 | 1 | 44 |
| | 1 | 1 | 0 | 0 | 48 |
| | 1 | 1 | 0 | 1 | 52 |
| | 1 | 1 | 1 | 0 | 56 |
| | 1 | 1 | 1 | 1 | 60 |

The details of the recognition sequence will now be explained with reference to FIG. 6. The initial step in this recognition sequence is shown at Step 241 of FIG. 6 as a decrementing of the variable N which, as previously discussed, defines the total number of states in the new word to be recognized. It will be recalled that the value N includes the final silence state of the new state sequence and the decrementing at Step 241 is used to reduce the total number of states to the actual meaningful states, without this final silence state, within the word to be recognized. Next, at Step 243 the pointer XTMP is reset to zero which will begin the comparison sequence with the first element of arrays REF, WT, and LN.

At Step 245, the variable CLASS is set to zero. This variable is used to indicate the current vocabulary word number involved in the comparison process. Step 249 initializes the variable BEST to hexadecimal 7F. This is the largest positive number possible in an 8 bit word. This variable will be used to track the current lowest distance score as the comparison process moves from one vocabulary word to the next. Step 253 sets the pointer YTMP=1 to allow the comparison process to start with the first valid entry in arrays SEG and VOWL. As stated earlier, these arrays contain the state sequence and state lengths of a new spoken word. At Step 255 in preparation for a comparison between the new word and a stored vocabulary word, the variable SCORE is set to zero. During the comparison process this variable will reflect the degree of dissimilarity between the new word and the stored word. It is reinitialized before each word comparison process is started. Step 257 sets the variable L equal to the element of array REF pointed to by XTMP. This will be the number of states in the current template word under comparison or, if all words have been exhausted, the hexadecimal value FF. The element in array REF referred to in Step 257 is compared to the value FF in Step 259. If it is equal to hexadecimal FF, it signifies that the end of the stored vocabulary templates has been reached and the exit procedure Step 261 (FIG. B) is executed.

Assuming that the stored vocabulary has not been exhausted, i.e., REF(XTMP) is not equal to FF at Step 259, the variable L1 is set equal to the variable N which is the number states in the word just spoken. The two variables L and L1 will be adjusted during the comparison of a word to reflect the number of states remaining to be compared in the new word and the stored vocabulary word. When both become zero, the comparison process for a specific template word is complete. After obtaining the total number of states, the pointer XTMP is incremented at Step 267 to select the next element of arrays REF, WT, and LN, in this case the first data element of each array.

The pointers XTMP and YTMP have been adjusted so as to be pointing at the correct element for the template and spoken input arrays, respectively. The actual word recognition valuation is now ready. Beginning at Step 270, the first state of the template word array is compared with the first state of the spoken input. If the states are identical, the variable SCORE, at Step 272, is increased by the absolute value of the difference between the lengths of the states, i.e., the absolute value of the difference between the duration of the spoken input, VOWL(YTMP) and the duration of the stored vocabulary template, LN(XTMP). The state counters for both the spoken word (L1) and the template word (L) are then both decremented at Step 274, while the array pointers for the spoken and template words, YTMP and XTMP, respectively, are incremented at Step 275.

Assuming, however, at step 270 that the states did not match, the variable SCORE is incremented by the value stored in the weighting array, WT, at the stored word pointer, XTMP at Step 277. The more important this state was for correct identification of the template vocabulary word, the higher the weight and the greater the increase in the variable SCORE. In Step 279 the template word array pointer, XTMP, is incremented, while the stored word state counter, L, is decremented in Step 281, in preparation for comparison of the next state. Note that only the template word pointer and counter are changed, the spoken word variables are left unchanged so that the current state of the spoken word can be checked for a match against a subsequent state of the stored word. It should be pointed out that the stored word contains all the states (even those of low probability) that may occur in each vocabulary word and, as a result, is of equal or greater length in terms of number of states to any new spoken version of the same word.

After each state comparison is complete and the score pointers and counters are properly adjusted, it must be determined whether or not the word evaluation is complete. The evaluation process is complete when state counters for both the spoken and stored word are zero, i.e., all states have been evaluated and a final score has been determined. Beginning at Step 283, the stored word state counter, L, is checked for zero. If the state count is not zero, i.e., not all of the stored word states have been evaluated, the spoken word state counter is checked for zero at Step 285. If the spoken word counter is also not zero, then the state comparison is not complete and the state comparison process continues at Step 269. If the spoken word state counter is zero, then the score is increased by the sum of the weights of the remaining uncompared stored word states. This process begins at Step 287 where the score is increased by the weight of the current stored word state, i.e., WT(XTMP). The stored word state, pointer, XTMP, is incremented at Step 289 and the spoken word state counter, L, is decremented at Step 291. The process of summing the weights and adjusting the pointer and counter continues until the stored word state counter, L, is zero.

Figure 7:
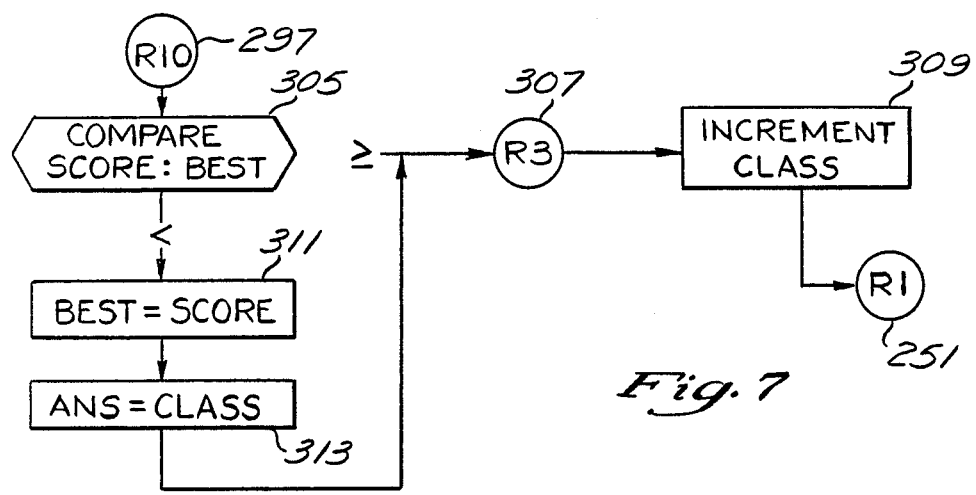

After evaluation of all stored word states, either by comparison with spoken word states or by summing of the remaining state weights, the stored word state counter, L, is zero, and control is transferred from Step 283 to step 293. At Step 293 the spoken word state counter, L1, is compared to zero. If the spoken word state counter is zero (and the stored word state counter has previously been established as being zero at Step 283), the comparison of the spoken and stored word states is completed, i.e., a final score has been established. If the comparison is complete, an evaluation process of SCORE is begun at Step 305 (FIG. 7). If more states remain in the spoken word while all states in the stored word have been exhausted, then at Step 299 the distance measure SCORE is increased by twice the length of the added state(s) or 10, whichever is greater. Every extra state in the spoken word increases the distance measure SCORE and makes it less likely to classify the spoken word as the stored word, the increase being related to the amount of additional data (length) in the spoken word. Steps 301 and 303 increment the spoken word state pointer, YTMP, and decrement the spoken word state counter, L1, respectively. The process repeats beginning at Step 295 until the spoken word state counter becomes zero indicating that the score updating is complete.

Referring to FIG. 7, when the process of comparing a new word with a stored vocabulary word has been completed and the SCORE has been established, SCORE is compared to the lowest score so far encountered, BEST at Step 305. If the current score is less than the previous best score, it replaces BEST in Step 311 (a score of zero represents a perfect match of both states and lengths). Along with keeping with the curent best score, at Step 313 the word number (CLASS) associated with that score is stored in the variable ANS. If the current score is greater than or equal to the best score up to that point, Steps 311 and 313 are not executed. At Step 309 the word number, CLASS is incremented in preparation for the next comparison with a stored vocabulary word. Control passes to Step 251 (FIG. 6) where the same evaluation process repeats for the next stored word.

Figure 8:
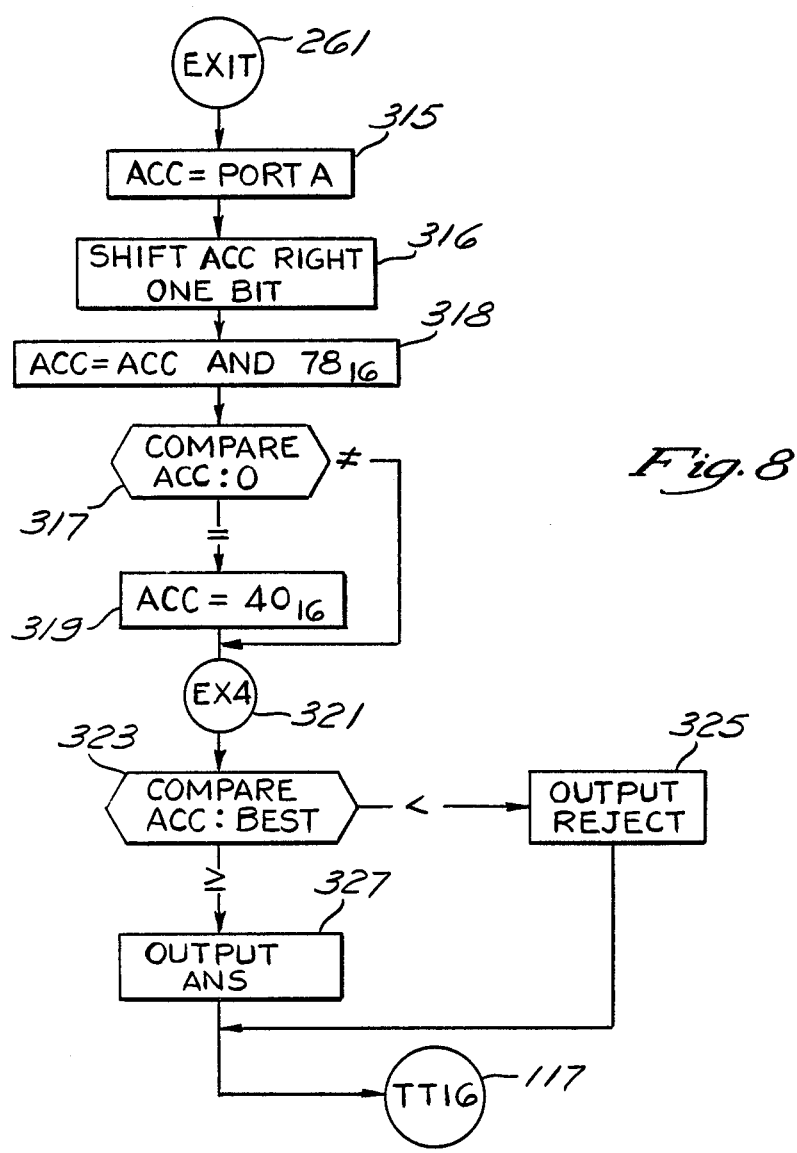

When all comparisons have been completed, i.e., the first state of the stored word is hexadecimal FF at Step 259, this acts to transfer control to EXIT, 261 in figure 8. At this point the lowest score, BEST and its associated word number, ANS have been determined. Input port A 21 is read into the accumulator, ACC, in step 315 to determine the value of a reject threshold to be used to control the degree to which a new word must match one of the stored vocabulary words. The lower the threshold, the closer the match must be. See Table 3 for the allowable reject thresholds. Since other bits on this port have different meanings, the variable ACC is shifted right 1 bit (step 316) and the data is logically anded at Step 318 with hexadecimal 78 to strip off unwanted bits.

If all pins are tied low (ground), a default value of hexadecimal 40 is used for the threshold as shown in Step 317 and 319. If all pins are not tied low control passes to step 321 and the value computed from Port A as the threshold value.

If the reject threshold in the accumulator is greater than the BEST score as measured at step 323, the word number, ANS, is output to port B 23 at step 327, otherwise a reject line, port B 23, bit 7 is activated at step 325 to indicate that the match was not close enough. Control then passes to point Step 117 to await a new spoken word.

The utility of the present word recognition system is illustrated by the following example. As shown in FIG. 2, the output port B 23 may be connected such that its least significant bit, bit B0, is connected to a relay coil 301 which actuates a pair of switch contacts 303. Similarly, the next least significant bit, bit B1, may be connected to a relay coil 305 which actuates a switch pair 307.

The entire system including the microprocessor 17 the high gain audio amplifier 13, the microphone 11, and a battery power supply for the system may be housed within a small toy robot. In this instance, the toy robot may include, for example, a motor 309 connected to rotate the robot's head, and a second motor 311 connected to drive a tractor mechanism to make the robot walk. The robot head rotater 309 is actuated by the switch 303, while the robot's tractor motion is controlled by the switch 307. It can be seen that, if the output word from port B 23 is the binary number 01, the robot's head will be rotated, since a binary 1 output at bit B0 will actuate the relay 301 to close the switch 303. Similarly, output of the binary number 10, equivalent to decimal 2, from the port B 23, will cause the relay 305 to actuate, closing the switch 307 and causing the robot to walk. Similarly output of the binary number 00 from port B 23, will cause all motion of the robot to cease. In addition, the microcomputer could be wired such that the eyes, for example, of the robot would light up or turn off depending on an order given by a user.

The following table, Table 4, is an example of the state sequence templates which would be stored in the read-only memory 19 of the mircoporcessor 17 in order to recognize the English spoken words, "search", "stop", "go", "lights", and "lights off".

TABLE 4

|     |                      |            |
| --- | -------------------- | ---------- |
| REF | 4, 2, 1, 0, 2        | SEARCH     |
|     | 6, 2, 0, 2, 1, 0, 1  | STOP       |
|     | 2, 2, 1              | GO         |
|     | 3, 1, 0, 2           | LIGHTS     |
|     | 5, 1, 0, 2, 1, 2     | LIGHTS OFF |
| WT  | 0, 10, 10, 10, 10    | SEARCH     |
|     | 0, 18, 18, 4, 18, 2, 2 | STOP     |
|     | 0, 5, 30             | GO         |
|     | 0, 10, 7, 10         | LIGHTS     |
|     | 0, 5, 5, 5, 10, 10   | LIGHTS OFF |
| LN  | 0, F, 10, 0, B       | SEARCH     |
|     | 0, B, 0, 2, 13, 0, B | STOP       |
|     | 0, 2, 10             | GO         |
|     | 0, 22, 2, 12         | LIGHTS     |
|     | 0, 16, 2, 7, 26, 2   | LIGHTS OFF |

These state sequence templates are in the form of Table 2 above, with the first digit identifying the number of states within each sequence. From the templates listed in Table 4, it can be seen that the Engligh words "search" and "go" provide fairly defined state sequences.

From Table 4 and the previous description of FIGS. 2-6 it can be seen that, by speaking the words "search", "stop", and "go ahead" into the microphone 11, a user can cause a robot to turn its head, stop, and walk in whatever order the user selects. This is, of course, an extremely simple example, but it shows the utility of the present invention. It should be recognized that the switches 307 and 303 and a variety of other switches connected to the ports 21, 23, and 25 can be used to control a variety of consumer or industrial products in accordance with the identification of spoken words.

The words "lights" and "lights off" are particularly instructive here. In the above example the word "lights" is pronounced by some people as "lice", the silence state being omitted. Since the silence state is not absolutely required to identify the word (in this example), the weight associated with the silence state (0) may be lower than the other states so as not to penalize its ommission so heavily. As can be seen in this example, the weight assigned to the middle silence state is 7 as opposed to the weight 10 assigned to the other two states. The threshold here would probably be set fairly high because the cost of an error, i.e. the robot turning his lights on in response to a totally different word, is not very high. Thus the threshold value could be 25 and still reject words that are clearly incorrect. It can be seen that, because of the higher overall weight involved in the word "lights off", that it will be more difficult to get the lights to go off accidentally. Should we decide that we want the lights to go off only on command, then we might weight each of these states much higher. For example, we might have a weighting series of 10, 10, 10, 20, 20, instead of the series 5, 5, 5, 10, 10, already there.

As described above, one advantage of this recognition system is that a word spoken substantially differently by two different speakers can still be recognized as the same word without the need to include a series of stored templates in anticipation of these different pronounciations. Thus the person who says "lice" for the word "lights" will still find that the robot will have his lights turned on when he says the word "lice". This is because, when the microcomputer compares the second state of the vocabulary word template array with the second state of the incoming stored array and finds that the classifications are not the same, the penalty for the speaker will only be an increase in the variable SCORE of 7. (this is from the weighting value for the silence state of the word "lights" which is not found when the speaker says the word "lights" as "lice"). The microcomputer then goes on to compare the next state in the template array which will be a fricative-like sound with the same state of the input word array that was compared earlier. In this second comparison, of course, the two classifications will match and the only increase to the variable SCORE will be the absolute value of the difference between the average length stored in the template for that state and the actual length of that state as spoken. Thus the word "lice" will be recognized as "lights".

Figure 9:
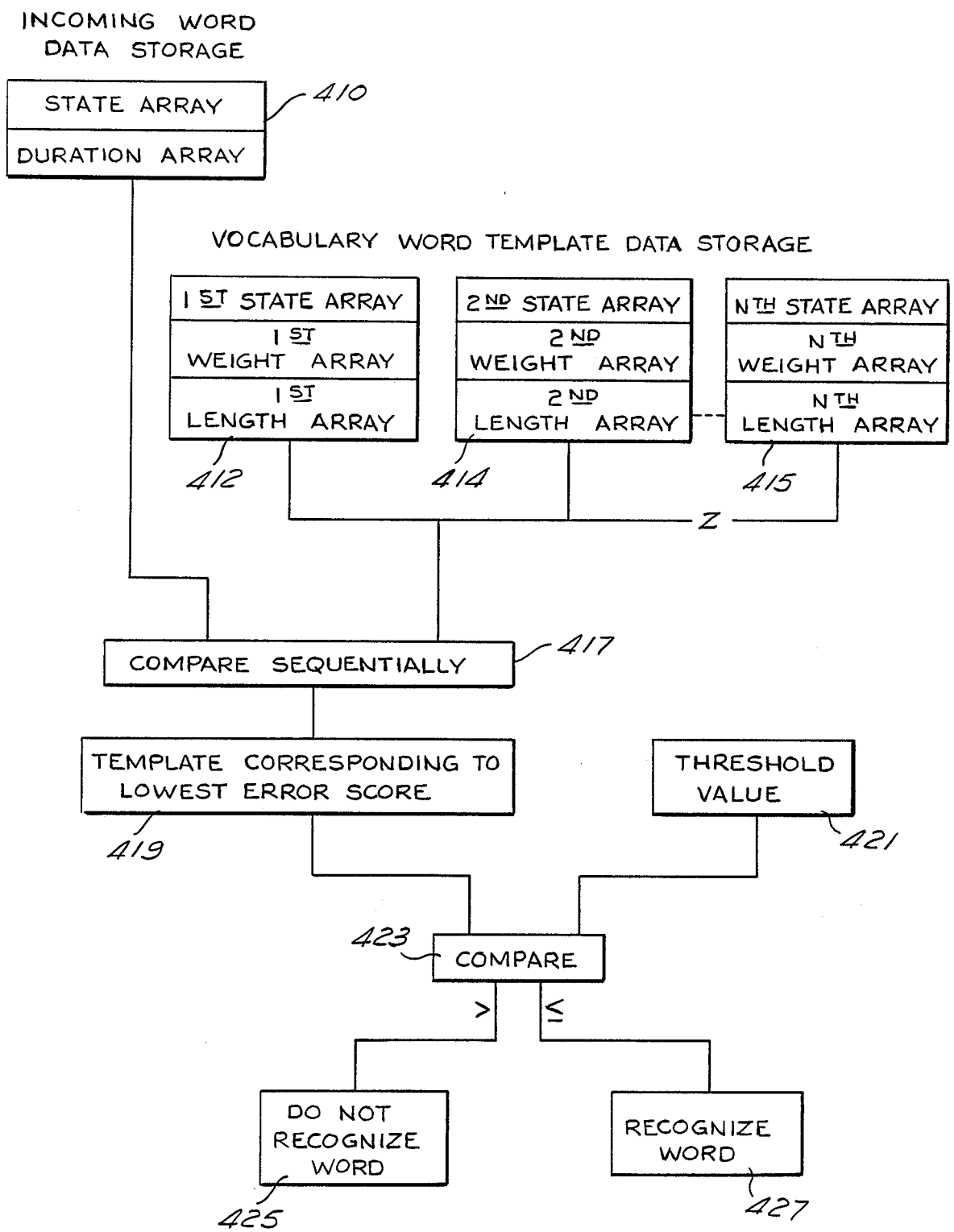
FIG. 9 shows a simplified view of the data structure of the present invention.

FIG. 9 shows in simplified block diagram form, the basic data structure of the present invention. The "INCOMING WORD DATA STORAGE" 410 stores the incoming word state array and durational array. The "VOCABULARY WORD TEMPLATE DATA STORAGE" structures 412, 414, and 415 store the state, weight, and length arrays for each of the "n" words which are part of the vocabulary of the speech recognition apparatus. The incoming word data is then compared sequentially with each of the templates at 417. The template corresponding to the lowest error score is then determined at 419. The value of the lowest error score is then compared to the threshold value 421 at 423. If the error score is greater than the threshold value, the word corresponding to the template having the lowest error score is not recognized 425. However, if the error score is less than or equal to the threshold value, the word corresponding to the template is recognized by the system at 427.

The following Table 5 lists a computer program which is compatible with the Motorola Model MC6805P2 HMOS microcomputer utilized in the preferred embodiment. It will be recognized, of course, that by utilizing the flow chart information of FIGS. 3–8 and the general description given above, the present invention can be implemented using a variety of computer programs or special purpose computing equipment.

TABLE 5

© copyright 1983,
Interstate Electronics Corporation, all rights reserved

|      |       |        |
|------|-------|--------|
|      | .ORG  | 3C0H   |
|      | LDA   | #$FF   |
|      | STA   | BDDR   |
|      | STA   | CDDR   |
|      | STA   | TOYFLG |
|      | CLR   | PORTB  |
| TT16 | CLR   | A      |
|      | STA   | FCNT   |
|      | STA   | VCNT   |
|      | STA   | SCNT   |
|      | TAX   |        |
|      | STA   | N      |
|      | STA   | SEG,X  |
|      | STA   | VOWL,X |
|      | LDA   | #$7F   |
|      | STA   | TIMDAT |
| TT2  | LDA   | #5     |
|      | STA   | DELAY  |
| TT32 | CLR   | A      |
| TT31 | INC   | A      |

TABLE 5-continued

© copyright 1983,
Interstate Electronics Corporation, all rights reserved

|       |       |         |
|-------|-------|---------|
|       | BNE   | TT31    |
|       | DEC   | DELAY   |
|       | BNE   | TT32    |
|       | LDA   | #$7F    |
|       | SUB   | TIMDAT  |
|       | STA   | ZCRA    |
|       | BSET0 | PORTC   |
|       | BCLR0 | PORTC   |
|       | LDA   | #$7F    |
|       | STA   | TIMDAT  |
|       | LDA   | ZCRA    |
|       | CMP   | #1      |
|       | BPL   | TT9     |
|       | INC   | SCNT    |
|       | LDA   | SEG,X   |
|       | BEQ   | TT12    |
|       | LDA   | SCNT    |
|       | CMP   | #2      |
|       | BPL   | TT11    |
|       | BRA   | TT10    |
| TT11  | LDA   | SEG,X   |
|       | CMP   | #1      |
|       | BEQ   | TT18    |
|       | LDA   | FENT    |
|       | STA   | VOWL,X  |
|       | BRA   | TT19    |
| TT18  | LDA   | VCNT    |
|       | STA   | VOWL,X  |
| TT19  | INC   | X       |
|       | CLR   | A       |
|       | STA   | SEG,X   |
|       | STA   | VOWL,X  |
| TT12  | CLR   | A       |
|       | STA   | FCNT    |
|       | STA   | VCNT    |
|       | LDA   | SCNT    |
|       | CMP   | #$10    |
|       | BMI   | TT10    |
|       | TST   | X       |
|       | BEQ   | TT16    |
|       | STX   | N       |
|       | JMP   | TT26    |
| TT10  | JMP   | TT2     |
| TT9   | LDA   | SEG,X   |
|       | BNE   | TT8     |
|       | LDA   | ZCRA    |
|       | CMP   | #$10    |
|       | BPL   | TT7     |
|       | JMP   | TT6     |
| TT8   | CMP   | #1      |
|       | BNE   | TT5     |
|       | LDA   | ZCRA    |
|       | CMP   | #$18    |
|       | BPL   | TT7     |
|       | INC   | VCNT    |
|       | JMP   | TT4     |
| TT7   | INC   | FCNT    |
|       | LDA   | FCNT    |
|       | CMP   | #2      |
|       | BMI   | TT3     |
|       | LDA   | SEG,X   |
|       | CMP   | #1      |
|       | BEQ   | TT15    |
|       | CLR   | A       |
|       | STA   | VOWL,X  |
|       | BRA   | TT14    |
| TT15  | LDA   | VCNT    |
|       | STA   | VOWL,X  |
| TT14  | INC   | X       |
|       | LDA   | #2      |
|       | STA   | SEG,X   |
| TT17  | CLR   | A       |
|       | STA   | SCNT    |
|       | STA   | VCNT    |
|       | JMP   | TT3     |
| TT5   | LDA   | ZCRA    |
|       | CMP   | #$10    |
|       | BPL   | PT11A   |
|       | JMP   | TT6     |
| PT11A | INC   | FCNT    |

TABLE 5-continued
© copyright 1983,
Interstate Electronics Corporation, all rights reserved

|  | | |
|---|---|---|
|  | JMP | TT17 |
| TT6 | INC | VCNT |
|  | LDA | VCNT |
|  | CMP | #6 |
|  | BMI | TT3 |
|  | LDA | FCNT |
|  | STA | VOWL,X |
|  | INC | X |
|  | LDA | #1 |
|  | STA | SEG,X |
| TT4 | CLR | A |
|  | STA | SCNT |
|  | STA | FCNT |
| TT3 | JMP | TT2 |
| TT26 | LDA | SEG-1,X |
|  | BNE | TT30 |
|  | DEC | X |
|  | BEQ | TT29 |
|  | LDA | SEG-1,X |
| TT30 | CMP | #1 |
|  | BNE | TT27 |
|  | LDA | VOWL-1,X |
|  | CMP | #6 |
|  | BPL | TT28 |
|  | DEC | X |
|  | JMP | TT26 |
| TT27 | CPX | #3 |
|  | BPL | TT28 |
| TT29 | JMP | TT16 |
| TT28 | STX | N |
| REC | DEC | N |
|  | LDA | #0 |
|  | STA | XTMP |
|  | STA | CLASS |
|  | LDA | #$7F |
|  | STA | BEST |
| R1 | LDA | #1 |
|  | STA | YTMP |
|  | CLR | SCORE |
|  | LDX | XTMP |
|  | LDA | REF,X |
|  | STA | L |
|  | CMP | #$FF |
|  | BNE | R4 |
|  | JMP | EXIT |
| R3 | INC | CLASS |
|  | JMP | R1 |
| R4 | LDA | N |
|  | STA | L1 |
|  | INC | X |
|  | STX | XTMP |
| R8 | LDX | YTMP |
|  | LDA | SEG,X |
|  | LDX | XTMP |
|  | CMP | REF,X |
|  | BEQ | R5 |
|  | LDA | WT,X |
|  | ADD | SCORE |
|  | STA | SCORE |
|  | INC | XTMP |
|  | INC | X |
|  | DEC | L |
|  | JMP | R7 |
| R5 | LDA | LN,X |
|  | LDX | YTMP |
|  | SUB | VOWL,X |
|  | BPL | R6 |
|  | LDA | VOWL,X |
|  | LDX | XTMP |
|  | SUB | LN,X |
| R6 | DEC | L |
|  | DEC | L1 |
|  | INC | XTMP |
|  | INC | YTMP |
|  | STA | TEMP |
|  | ADD | SCORE |
|  | STA | SCORE |
| R7 | LDA | L |
|  | BEQ | R9 |
|  | LDA | L1 |

TABLE 5-continued
© copyright 1983,
Interstate Electronics Corporation, all rights reserved

|  | | |
|---|---|---|
|  | BNE | R8 |
|  | LDX | XTMP |
|  | LDA | WT,X |
|  | ADD | SCORE |
|  | STA | SCORE |
|  | INC | XTMP |
|  | DEC | L |
|  | JMP | R7 |
| R9 | LDA | L1 |
|  | BEQ | R10 |
|  | LDX | YTMP |
|  | LDA | VOWL,X |
|  | LSL | A |
|  | CMP | #$A |
|  | BPL | R91 |
|  | CDA | #$A |
| R91 | ADD | SCORE |
|  | STA | SCORE |
|  | INC | YTMP |
|  | DEC | L1 |
|  | JMP | R9 |
| R10 | LDA | SCORE |
|  | BMI | R33 |
|  | CMP | BEST |
|  | BPL | R33 |
|  | STA | BEST |
|  | LDA | CLASS |
|  | STA | ANS |
| R33 | JMP | R3 |
| EXIT | LDA | PORTA |
|  | AND | #$78 |
|  | LSR | A |
|  | BNE | EX4 |
|  | LDA | #$40 |
| EX4 | CMP | BEST |
|  | BPL | EX1 |
|  | BSET | 7,PORTB |
|  | JMP | TT16 |
| EX1 | LDA | ANS |
|  | STA | PORTB |
|  | JMP | TT16 |

From the robot example which is presented above, it can be seen that the present invention provides speaker independence and relatively low error rates by careful preselection of the recognizable vocabulary. From Table 4 it can be seen that none of the recognizable words "search", "stop", "go", "lights", and "lights off", have any identical state templates. This permits accurate differentiation between these three spoken words, but does not permit differentiation of any of these words from other similar words in the same language. The present invention accepts this inability to differentiate recognizable words from words outside of the recognizable group in order to simplify the system hardware and thus significantly reduce the cost and complexity of the recognition system.

The system described above includes several important characteristics. Initially, the spoken sounds are periodically sampled and the individual samples are differentiated using zero crossing data alone, without a system front end filter, into fricative-like, vowel-like, and silence intervals. Successive groups of these intervals are counted, and the count must reach a predetermined number in order for the system to define a fricative-like state, vowel-like state, or silence state. The particular number of samples used to define existence of a particular state may depend upon the location of that state within the word. For example, a vowel sound at the end of a word must have a 160-millisecond duration in order to be recognized as a vowel-like state, whereas a vowel sound in the middle of a word must have a duration of only 60 milliseconds to be recognized as a vowel-like state.

The requirement for multiple, sequential, identical intervals in order to achieve state recognition provides, in effect, a first order of system hysteresis, since a change of average frequency content from fricative-like to vowel-like, for example, requires that the vowel-like average remain for some predetermined duration before a vowel-like sequence will be recognized.

A second form of system hysteresis is provided by permitting a variation of the number of zero crossings used to identify a particular sample increment as fricative-like or vowel-like. For example, if the previous state were silence, a zero crossing count of 16 within 10 milliseconds, indicating an average sound frequency above 1600 hertz, will yield a fricative-like interval. If, however, the previous state were a vowel-like state, the zero crossing count must exceed 24, indicating a frequency average above 2400 hertz, a much higher frequency than in the case of a previous silence state. This makes it more difficult to achieve the transition from a vowel-like sound to a fricative-like sound since it has been determined that the termination of a vowel-like sound may often form frequency components in the range between 1600 and 2400 hertz which do not indicate an actual fricative-like sound. Thus, this second order hysteresis is variable, depending upon the previous state.

The system also provides the elimination of short vowel-like states at the end of state sequences, since it has been determined that these often result form the dissipation of energy at the end of a fricative-like sound rather than an actual vowel ending.

Recognition is achieved by comparing the state sequence of the spoken word with the state sequence of a stored template. When the states match, an error score is increased by the difference in length of the spoken state and the expected length corresponding to the word stored in the template. The microcomputer then goes on to compare the classifications of the next state in the spoken word array with the next state in the template array. When the states do not match, the error score is increased in accordance with a weighting function. The microcomputer then goes on to compare the classification of the same state in the spoken word array with the next state in the template array. The weighting function is selected so that a large error is created when there is a mismatch in critical states while a small error is generated for a mismatch in less critical states. This permits the microcomputer, in effect, to ignore a missing state when it is not important to the recognition of the word.

What is claimed is:

1. Speech recognition apparatus comprising:
   means for converting audio speech into electroninc signals;
   means for diverting the incoming speech up along a time line into an array of sequential word states based on the content of the speech, each word state having a time period;
   means for classifying each word state as one of a plurality of classifications based on the content of the speech during the corresponding time period;
   means for determining the duration of the time period corresponding to each word state within the array of incoming word states and for using the determined durations to provide an array of durational values corresponding to the word states of the incoming word state array;
   means for providing a plurality of stored templates representing the vocabulary of the speech recognition apparatus; each template being comprised of two arrays; the first array being a sequence of stored word states each state being classified as one of said plurality of classifications; the second array being a sequence of values indicating the duration of a corresponding stored word state;
   first comparing means for comparing the classifications of incoming word states with said first array of each of said templates to locate matching states;
   second comparing means for comparing the duration of each incoming word state with the duration of the corresponding stored word state only where the classifications of the word states match; and
   means responsive to both of said comparing means for determining which of said templates is the closest match to said array of incoming word states and said array of durational values.

2. Speech recognition apparatus as defined in claim 1 wherein said converting means includes a high gain amplifier driven to saturation by said speech.

3. Speech recognition apparatus as defined in claim 2 wherein said converting means further includes a microphone for providing a speech input to said amplifier.

4. Speech recognition apparatus as defined in claim 1 wherein said dividing and classifying means includes:
   means for determining the frequency of the incoming speech from said electronic signals;
   means for dividing the incoming speech signals into equal time portions;
   means for classifying each time portion as fricative-like, vowel-like, or silence based on the average frequency of the incoming speech signals during the time portion;
   means for designating a group of time portions as an incoming state when a predetermined number of proximately located time portions have the same classifications, and for classifying the state in accordance with the predominate classification of the time portions which make up the state.

5. Speech recognition apparatus as defined in claim 1 wherein said plurality of classifications are fricative-like, vowel-like, and silence.

6. Speech recognition apparatus as defined in claim 1 wherein said comparing means sequentially compares the classifications of the states of the incoming word state array with the classifications of the template state array.

7. Speech recognition apparatus as defined in claim 6 wherein said determining means includes:
   means for generating an error value representative of the degree of matching between the incoming word state array and the template state array.

8. Speech recognition apparatus as defined in claim 7 wherein each of said stored templates further includes a third array having a series of weighting values, one value being assigned to each stored word state based on the importance of the word state to recognition of the word;
   wherein said determining means is further responsive to said third array;
   wherein said error value generating means includes:
   means for increasing the error value by the absolute value of the difference between the values of said duration arrays corresponding to the particular states being compared when the classifications of the states being compared are the same; and means for increasing the error value by an amount equal to the weighting value of said weighting array corresponding to the particular state of said template state array being compared when the classifications of the states being compared are not the same.

9. Speech recognition apparatus as defined in claim 8 wherein said first comparing means further includes means for comparing the last compared incoming speech state with the next state in the template state array when the last compared states had classifications which did not match.

10. Speech recognition apparatus as defined in claim 8 wherein said determining means further includes means for designating the template with the lowest error value as the template which is the closest match to the incoming speech state array.

11. Speech recognition apparatus as defined in claim 10 further including means for rejecting matches that are too remote, and wherein said rejecting means rejects the closest matching template when the error value corresponding to that template is greater than a predetermined threshold value.

12. Speech recognition apparatus as defined in claim 11 further including means for recognizing the incoming spoken word state array as the word corresponding to the template selected as having the closest match provided this template has not been rejected by said rejecting means.

13. A method of recognizing speech comprising:
providing an array of classified states representing a spoken word;
providing a template state array composed of a sequence of classified states representing a stored vocabulary word;
sequentially comparing the classifications of the states of said template state array with the classifications of the states of said spoken word state array until a mismatch is found;
after a mismatch is found comparing the classification of the last compared spoken word state sequentially with the classification of the next state of the template state array until a match is found.

14. A method of recognizing speech as defined in claim 13 additionally comprising:
generating an error value representing the degree of match between the spoken word state array and the template state array.

15. A method of recognizing speech as defined in claim 14 additionally comprising:
increasing said error value by a preselected weighting function when the classification of a state in the spoken word array doesn't match a compared state in the template array.

16. A method of recognizing speech as defined in claim 15 comprising:
increasing said error value by the absolute difference between the length of a spoken word state and a compared template word state where the classifications of said states match.

17. Speech recognition apparatus comprising:
means for converting incoming speech into a word state array, and for classifying each state in said array as one of a plurality of classifications;
a plurality of stored templates, each template including an array of classified states;
means for comparing the states of said word state array with the states of said stored template array and generating an error value, for increasing said error value based on a first speech parameter if the state classifications match, and for increasing said error value based on a second speech parameter if the state classifications do not match.

18. A method for speech recognition comprising:
dividing incoming speech into an array of classified speech states;
providing a template state array composed of classified states representing a stored vocabulary word;
providing a weight for at least some states of said template state array, said weight being related to the states' importance in recognition of the vocabulary word;
comparing the incoming speech state array with the template state array to determine which states of said template state array are missing from said incoming speech state array, and
generating a measure of the degree of matching between the classifications of the states of the incoming speech state array and the template state array, said measure being a function of the weights corresponding to template states which are found to be missing in the incoming array.

19. A method for speech recognition comprising:
dividing incoming speech into an array of classified speech states;
measuring the length of each speech state;
providing a template representing a stored vocabulary word, said template including a first array of classified word states and a second array including a sequence of values indicating the length of corresponding word states;
comparing said incoming speech state array with said template state array; and
generating a measure of the degree of matching between said incoming speech state array and said template word state array, said measure being a function of the differences in length between said incoming speech states and matching template word states.

20. Speech recognition apparatus comprising:
means for dividing a spoken word into equal time portions, and for classifying each portion as either fricative-like, vowel-like, or silent;
means for designating a group of time portions as an incoming state when a predetermined number proximately located time portions have the same classifications, and for classifying the state in accordance with the predominant classification of the time portions which make up the state;
a stored template representing a vocabulary word including an array of states, each state being classified as either fricative-like, vowel-like, or silent;
means for sequentially comparing the spoken word array with the template array to determine whether the classifications of the states match;
means permitting recognition of the spoken word as the word represented by the template even where the number of states in the spoken word array is different from the number of states in the template array.

21. In a programmed computer system for recognizing human speech, a data structure for comparing incoming speech patterns with stored templates, comprising:

a. first means in said data structure responsive to incoming speech for dividing the speech into an array of states, for classifying each state as one of a plurality of classifications and for storing first coded signals representing the array of classified states;

b. second means in said data structure responsive to the length of each said incoming speech states for storing second coded signals representing an array of values, equal in number to the number of states in the incoming speech state array, said values indicating the length of each corresponding speech state;

c. third means in said data structure storing third coded signals indicative of recognition templates representing stored vocabulary words, each template including an array of classified states, an array of length values one value corresponding to each of the classified states of the template, and an array of weighting values, one value corresponding to each of the classified states of the template and said weighting values being assigned based on the importance of the particular state to recognition of the word represented by the template;

d. fourth means in said data structure for comparing the coded signals representing the classifications of the incoming speech states in the order of the state sequence with the classifications of the template states;

e. fifth means in said data structure for storing coded signals representing an error value indicating the degree of matching between the incoming speech state array and the template state array;

f. sixth means in said data structure for determining the absolute value of the difference between the length stored by said second means and the length stored by said third means and adding this value to the error value when the states being compared have the same classifications but different lengths; and g. seventh means in said data structure for adding the weighting value stored by the third means to the error value when the states being compared have different classifications.

22. Speech recognition apparatus comprising:
a circuit which converts a spoken word into an array of classified states;
a circuit storing a template state array composed of a sequence of classified states representing a stored vocabulary word;
a circuit which acts to sequentially compare the classifications of the states of the template state array with the classifications of the states of the spoken word state array until a mismatch is found, and, after a mismatch is found, to compare the classification of the last compared spoken word state sequentially with the classifications of the next states of the template state array until a match is found.

23. Speech recognition apparatus comprising:
a circuit which divides incoming speech into an array of classified speech states;
a circuit storing a template state array composed of classified states representing a stored vocabulary word;
a circuit storing a weighting array including a weighting value corresponding to states of said template state array, said weighting value being related to the corresponding states' importance in recognition of the vocabulary word;
a circuit which acts to compare the incoming speech state array with the template state array;
a circuit which generates a measure of the degree of matching between the classifications of the states of the incoming speech state array and the template state array, said measure being a function of the weights corresponding to template states which are found to be missing in the incoming array.

24. Speech recognition apparatus comprising:
a circuit which divides incoming speech into an array of classified speech states and measures the length of each speech state;
a circuit storing a template representing a vocabulary word of the speech recognition apparatus, said template including a first array of classified word states and a second array composed of a sequence of values indicating the length of corresponding stored word states;
a circuit which acts to compare the incoming speech state array with the template state array;
a circuit which generates a measure of the degree of matching between the incoming speech state array and the template word state array, said measure being a function of the differences in length between the incoming speech states and the corresponding template word states of states that have matching classifications.

25. A method for speech recognition comprising:
dividing a spoken word into equal time portions and classifying each as either fricative-like, vowel-like or silent;
designating a group of time portions as an incoming state when a predetermined number of approximately located time portions have the same classification, and classifying the states in accordance with the predominant classification of the time portions which make up the state;
providing a template representing a vocabulary word, said template including an array of states, each state being classified as either fricative-like, vowel-like, or silence;
comparing the spoken word state array sequentially with the template state array to determine whether the classifications of the states match; and
permitting recognition of the spoken word as the word represented by the template even where the number of states in the spoken word array is different from the number of states in the template array.

26. The apparatus of claim 1 wherein the sequence of values of the second array of each template indicate the average duration of the corresponding word state.

27. The apparatus of claim 7 wherein said error value generating means includes means for increasing the error value by the absolute value of the difference between the values of said duration arrays corresponding to the particular states being compared when the classification of the states being compared are the same.

28. The method of claim 19 wherein the sequence of values of the second array of the template indicate the average duration of the corresponding word states.

29. The method of claim 19 wherein said dividing step includes classifying said speech states as either fricative, vowel-like or silent.

30. The date structure of claim 21 wherein the array of length values in the third means is an array of average length values.

31. The apparatus of claim 24 wherein the sequence of values of the second array of said template indicate the average length of the corresponding stored word states.

32. Speech recognition apparatus comprising:

means for converting audio speech into electronic signals;

means for dividing the incoming speech into an array of incoming word states, and for classifying each word state as one of a plurality of classifications;

means for determining the duration of each word state within the array of incoming word states and for using the determined durations to provide an array of durational values corresponding to the word states of the incoming word state array;

means for providing a plurality of stored templates representing the vocabulary of the speech recognition apparatus; each template being comprised of three arrays; the first array being a sequence of stored word states, each state being classified as one of said plurality of classifications; the second array being a sequence of values indicating the duration of a corresponding word state; the third array being a series of weighting values, one value being assigned to each stored word state based on the importance of the word state to recognition of the word;

means for sequentially comparing the classifications of the states of the incoming word state array with the classifications of the template state array to locate matching states;

means responsive to said second array and said comparing means for generating an error value representative of the degree of matching between the incoming word state and durational arrays and each of the templates, said error value generating means further including means for increasing the error value by the absolute value of the difference between the values of said durational arrays corresponding to the particular states being compared when the classifications of the states being compared are the same;

means for increasing the error value by an amount equal to the weighting value of said weighting array corresponding to the particular state of said template state array being compared when the classifications of the states being compared are not the same; and means, using said error value, the determine which of said templates is the closest match to said array of incoming word states and said array of durational values.

33. A method of recognizing speech comprising:

providing an array of classified states representing a spoken word;

providing a template state array composed of a sequence of classified states representing a stored vocabulary word;

sequentially comparing the classifications of the states of said template state array with the classifications of the states of said spoken word state array until a mismatch is found;

after a mismatch is found, comparing the classification of the last compared spoken work state sequentially with the classification of the next state of the template state array until a match is found;

generating an error value representing the degree of match between the spoken word state array and the template state array;

increasing said error value by a preselected weighting function when the classification of the state in the spoken word array does not match a compared state in the template array.

* * * * *